(12) United States Patent
Nhep et al.

(10) Patent No.: US 8,417,074 B2
(45) Date of Patent: Apr. 9, 2013

(54) FIBER OPTIC TELECOMMUNICATIONS MODULE

(75) Inventors: Ponharith Nhep, Savage, MN (US); Kristofer Bolster, Jordan, MN (US); Timothy G. Badar, St. Paul, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 481 days.

(21) Appl. No.: 12/619,777

(22) Filed: Nov. 17, 2009

(65) Prior Publication Data

US 2010/0129028 A1    May 27, 2010

Related U.S. Application Data

(60) Provisional application No. 61/116,973, filed on Nov. 21, 2008.

(51) Int. Cl.
*G02B 6/28* (2006.01)
*G02B 6/38* (2006.01)

(52) U.S. Cl.
USPC ............................................. 385/24; 385/59

(58) Field of Classification Search ............. 385/24, 385/59
See application file for complete search history.

(56) References Cited

U.S. PATENT DOCUMENTS

| | | |
|---|---|---|
| 4,359,262 A | 11/1982 | Dolan |
| 4,502,754 A | 3/1985 | Kawa |
| 4,585,303 A | 4/1986 | Pinsard et al. |
| 4,595,255 A | 6/1986 | Bhatt et al. |
| 4,630,886 A | 12/1986 | Lauriello et al. |
| 4,699,455 A | 10/1987 | Erbe et al. |
| 4,708,430 A | 11/1987 | Donaldson et al. |

(Continued)

FOREIGN PATENT DOCUMENTS

| | | |
|---|---|---|
| AU | 40995/85 | 4/1985 |
| AU | 55314/86 | 3/1986 |

(Continued)

OTHER PUBLICATIONS

International Search Report and Written Opinion mailed Feb. 26, 2010.

(Continued)

*Primary Examiner* — Ryan Lepisto
*Assistant Examiner* — Jerry Blevins
(74) *Attorney, Agent, or Firm* — Merchant & Gould P.C.

(57) ABSTRACT

A telecommunications module includes a main housing with an optical component within an interior of the main housing and a fiber optic adapter block coupled to the main housing, the adapter block including a one-piece main body including a top wall and a bottom wall, the adapter block defining a plurality of openings extending from a front end to a rear end of the main body, each opening defining a separate adapter, each opening defining a longitudinal axis, the adapters being configured to receive connectorized cables extending from the optical component within the interior of the main housing, the adapter block including at least one guide rail extending generally between the top wall and the bottom wall of the main body, the guide rail configured for slidably mounting the fiber optic telecommunications module to a telecommunications device once the adapter block has been coupled to the main housing, wherein the main housing includes an integrally formed pivotable latching arm configured to pivot for selectively latching and unlatching the telecommunications module for slidable movement with respect to the telecommunications device.

20 Claims, 13 Drawing Sheets

U.S. PATENT DOCUMENTS

| | | | |
|---|---|---|---|
| 4,717,231 A | 1/1988 | Dewez et al. | |
| 4,736,100 A | 4/1988 | Vastagh | |
| 4,747,020 A | 5/1988 | Brickley et al. | |
| 4,765,710 A | 8/1988 | Burmeister et al. | |
| 4,792,203 A | 12/1988 | Nelson et al. | |
| 4,824,196 A | 4/1989 | Bylander | |
| 4,861,134 A | 8/1989 | Alameel et al. | |
| 4,900,123 A | 2/1990 | Barlow et al. | |
| 4,948,220 A | 8/1990 | Violo et al. | |
| 4,971,421 A | 11/1990 | Ori | |
| 4,986,762 A | 1/1991 | Keith | |
| 4,995,688 A | 2/1991 | Anton et al. | |
| 5,023,646 A | 6/1991 | Ishida et al. | |
| 5,058,983 A | 10/1991 | Corke et al. | |
| 5,067,784 A | 11/1991 | Debortoli et al. | |
| 5,071,211 A | 12/1991 | Debortoli et al. | |
| 5,073,042 A | 12/1991 | Mulholland et al. | |
| 5,076,688 A | 12/1991 | Bowen et al. | |
| 5,100,221 A | 3/1992 | Carney et al. | |
| 5,129,030 A | 7/1992 | Petrunia | |
| 5,138,688 A | 8/1992 | Debortoli | |
| 5,142,598 A | 8/1992 | Tabone | |
| 5,142,606 A | 8/1992 | Carney et al. | |
| 5,160,188 A | 11/1992 | Rorke et al. | |
| 5,167,001 A | 11/1992 | Debortoli et al. | |
| 5,179,618 A | 1/1993 | Anton | |
| 5,214,735 A | 5/1993 | Henneberger et al. | |
| 5,233,674 A | 8/1993 | Vladic | |
| 5,274,729 A | 12/1993 | King et al. | |
| 5,274,731 A | 12/1993 | White | |
| 5,289,558 A | 2/1994 | Teichler et al. | |
| 5,317,663 A | 5/1994 | Beard et al. | |
| 5,318,259 A | 6/1994 | Fussler | |
| 5,333,221 A | 7/1994 | Briggs et al. | |
| 5,333,222 A | 7/1994 | Belenkiy et al. | |
| 5,335,349 A | 8/1994 | Kutsch et al. | |
| 5,353,367 A | 10/1994 | Czosnowski et al. | |
| 5,359,688 A | 10/1994 | Underwood | |
| 5,363,440 A | 11/1994 | Daoud | |
| 5,363,465 A | 11/1994 | Korkowski et al. | |
| 5,363,467 A | 11/1994 | Keith | |
| 5,367,598 A | 11/1994 | Devenish, III et al. | |
| 5,402,515 A | 3/1995 | Vidacovich et al. | |
| 5,408,557 A | 4/1995 | Hsu | |
| RE34,955 E | 5/1995 | Anton et al. | |
| 5,412,751 A | 5/1995 | Siemon et al. | |
| 5,420,958 A | 5/1995 | Henson et al. | |
| 5,432,875 A | 7/1995 | Korkowski et al. | |
| 5,442,726 A | 8/1995 | Howard et al. | |
| 5,448,015 A | 9/1995 | Jamet et al. | |
| 5,469,526 A | 11/1995 | Rawlings | |
| 5,490,229 A | 2/1996 | Ghandeharizadeh et al. | |
| 5,497,444 A | 3/1996 | Wheeler | |
| 5,511,144 A | 4/1996 | Hawkins et al. | |
| 5,542,015 A | 7/1996 | Hultermans | |
| 5,570,450 A | 10/1996 | Fernandez et al. | |
| 5,636,138 A | 6/1997 | Gilbert et al. | |
| 5,647,043 A | 7/1997 | Anderson et al. | |
| 5,689,604 A | 11/1997 | Janus et al. | |
| 5,708,751 A | 1/1998 | Mattei | |
| 5,715,348 A | 2/1998 | Falkenberg et al. | |
| 5,717,810 A | 2/1998 | Wheeler | |
| 5,734,776 A | 3/1998 | Puetz | |
| 5,758,002 A | 5/1998 | Walters | |
| 5,758,003 A | 5/1998 | Wheeler et al. | |
| 5,764,844 A | 6/1998 | Mendes | |
| 5,774,245 A | 6/1998 | Baker | |
| 5,774,612 A | 6/1998 | Belenkiy et al. | |
| 5,781,686 A | 7/1998 | Robinson et al. | |
| 5,784,515 A | 7/1998 | Tamaru et al. | |
| 5,823,646 A | 10/1998 | Arizpe et al. | |
| 5,825,955 A | 10/1998 | Ernst et al. | |
| 5,883,995 A | 3/1999 | Lu | |
| 5,887,095 A | 3/1999 | Nagase et al. | |
| 5,903,698 A | 5/1999 | Poremba et al. | |
| 5,909,526 A | 6/1999 | Roth et al. | |
| 5,930,425 A | 7/1999 | Abel et al. | |
| 5,945,633 A | 8/1999 | Ott et al. | |
| 5,956,444 A | 9/1999 | Duda et al. | |
| 5,966,492 A | 10/1999 | Bechamps et al. | |
| 5,969,294 A | 10/1999 | Eberle et al. | |
| 5,987,203 A | 11/1999 | Abel et al. | |
| 6,027,252 A | 2/2000 | Erdman et al. | |
| 6,041,155 A | 3/2000 | Anderson et al. | |
| 6,044,193 A | 3/2000 | Szentesi et al. | |
| 6,061,492 A | 5/2000 | Strause et al. | |
| 6,076,975 A | 6/2000 | Roth | |
| 6,079,881 A | 6/2000 | Roth | |
| 6,097,872 A | 8/2000 | Kusuda et al. | |
| 6,149,315 A | 11/2000 | Stephenson | |
| 6,160,946 A | 12/2000 | Thompson et al. | |
| 6,188,687 B1 | 2/2001 | Mussman et al. | |
| 6,188,825 B1 | 2/2001 | Bandy et al. | |
| 6,208,796 B1 | 3/2001 | Vigliaturo | |
| 6,227,717 B1 | 5/2001 | Ott et al. | |
| 6,234,683 B1 | 5/2001 | Waldron et al. | |
| 6,236,795 B1 | 5/2001 | Rodgers | |
| 6,240,229 B1 | 5/2001 | Roth | |
| 6,256,443 B1 | 7/2001 | Uruno | |
| 6,271,484 B1 | 8/2001 | Tokutsu | |
| 6,278,829 B1 | 8/2001 | BuAbbud et al. | |
| RE37,489 E | 1/2002 | Anton et al. | |
| 6,347,888 B1 | 2/2002 | Puetz | |
| 6,356,697 B1 | 3/2002 | Braga et al. | |
| 6,360,050 B1 | 3/2002 | Moua et al. | |
| 6,363,200 B1 | 3/2002 | Thompson et al. | |
| 6,385,381 B1 | 5/2002 | Janus et al. | |
| 6,411,767 B1 | 6/2002 | Burrous et al. | |
| 6,424,781 B1 | 7/2002 | Puetz et al. | |
| 6,425,694 B1 | 7/2002 | Szilagyi et al. | |
| 6,431,762 B1 | 8/2002 | Taira et al. | |
| 6,434,313 B1 | 8/2002 | Clapp, Jr. et al. | |
| 6,452,925 B1 | 9/2002 | Sistanizadeh et al. | |
| 6,453,033 B1 | 9/2002 | Little et al. | |
| 6,464,402 B1 | 10/2002 | Andrews et al. | |
| D466,087 S | 11/2002 | Cuny et al. | |
| 6,480,487 B1 | 11/2002 | Wegleitner et al. | |
| 6,483,977 B2 | 11/2002 | Battey et al. | |
| 6,496,640 B1 | 12/2002 | Harvey et al. | |
| 6,504,988 B1 | 1/2003 | Trebesch et al. | |
| 6,526,210 B1 | 2/2003 | Harrison et al. | |
| 6,532,332 B2 | 3/2003 | Solheid et al. | |
| 6,535,682 B1 | 3/2003 | Puetz et al. | |
| 6,539,147 B1 | 3/2003 | Mahony | |
| 6,539,160 B2 | 3/2003 | Battey et al. | |
| 6,542,688 B1 | 4/2003 | Battey et al. | |
| 6,554,485 B1 | 4/2003 | Beatty et al. | |
| 6,556,763 B1 | 4/2003 | Puetz et al. | |
| 6,577,595 B1 | 6/2003 | Counterman | |
| 6,591,051 B2 | 7/2003 | Solheid et al. | |
| 6,597,670 B1 | 7/2003 | Tweedy et al. | |
| 6,614,980 B1 | 9/2003 | Mahony | |
| 6,621,975 B2 | 9/2003 | Laporte et al. | |
| 6,623,170 B2 | 9/2003 | Petrillo | |
| 6,625,375 B1 | 9/2003 | Mahony | |
| 6,631,237 B2 | 10/2003 | Knudsen et al. | |
| RE38,311 E | 11/2003 | Wheeler | |
| 6,654,536 B2 | 11/2003 | Battey et al. | |
| 6,661,961 B1 | 12/2003 | Allen et al. | |
| 6,668,127 B1 | 12/2003 | Mahony | |
| 6,755,574 B2 | 6/2004 | Fujiwara et al. | |
| 6,760,530 B1 | 7/2004 | Mandry | |
| 6,760,531 B1 | 7/2004 | Solheid et al. | |
| 6,778,752 B2 | 8/2004 | Laporte et al. | |
| 6,788,786 B1 | 9/2004 | Kessler et al. | |
| 6,792,190 B2 | 9/2004 | Xin et al. | |
| 6,792,191 B1 | 9/2004 | Clapp, Jr. et al. | |
| 6,793,517 B2 | 9/2004 | Neer et al. | |
| 6,815,612 B2 | 11/2004 | Bloodworth et al. | |
| 6,845,207 B2 | 1/2005 | Schray | |
| 6,850,685 B2 | 2/2005 | Tinucci et al. | |
| 6,853,795 B2 | 2/2005 | Dagley et al. | |
| 6,870,734 B2 | 3/2005 | Mertesdorf et al. | |
| 6,888,069 B1 | 5/2005 | Chen et al. | |
| 6,901,200 B2 | 5/2005 | Schray | |
| 6,912,349 B2 | 6/2005 | Clark et al. | |
| 6,920,274 B2 | 7/2005 | Rapp et al. | |

| | | |
|---|---|---|
| 6,925,241 B2 | 8/2005 | Bohle et al. |
| 6,937,800 B2 | 8/2005 | Cote |
| 6,950,593 B2 | 9/2005 | Hodge et al. |
| 6,980,725 B1 | 12/2005 | Swieconek |
| 6,983,095 B2 | 1/2006 | Reagan et al. |
| 7,029,322 B2 | 4/2006 | Ernst et al. |
| 7,066,762 B2 | 6/2006 | Neer et al. |
| 7,086,539 B2 | 8/2006 | Knudsen et al. |
| 7,088,899 B2 | 8/2006 | Reagan et al. |
| 7,103,255 B2 | 9/2006 | Reagan et al. |
| 7,139,461 B2 | 11/2006 | Puetz et al. |
| 7,142,764 B2 | 11/2006 | Allen et al. |
| 7,142,765 B2 | 11/2006 | Rapp et al. |
| 7,146,089 B2 | 12/2006 | Reagan et al. |
| 7,149,398 B2 | 12/2006 | Solheid et al. |
| 7,171,102 B2 | 1/2007 | Reagan et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,277,620 B2 | 10/2007 | Vongseng et al. |
| 7,330,546 B2 | 2/2008 | Kessler et al. |
| 7,333,707 B2 | 2/2008 | Puetz et al. |
| 7,346,254 B2 | 3/2008 | Kramer et al. |
| 7,367,823 B2 | 5/2008 | Rapp et al. |
| 7,369,741 B2 | 5/2008 | Reagan et al. |
| 7,376,321 B2 | 5/2008 | Bolster et al. |
| 7,376,322 B2 | 5/2008 | Zimmel et al. |
| 7,376,323 B2 | 5/2008 | Zimmel |
| 7,400,813 B2 | 7/2008 | Zimmel |
| 7,407,330 B2 | 8/2008 | Smith et al. |
| 7,416,349 B2 | 8/2008 | Kramer |
| 7,457,503 B2 | 11/2008 | Solheid et al. |
| 7,471,869 B2 | 12/2008 | Reagan et al. |
| 7,555,193 B2 | 6/2009 | Rapp et al. |
| 7,623,749 B2 | 11/2009 | Reagan et al. |
| 7,646,958 B1 | 1/2010 | Reagan et al. |
| RE41,460 E | 7/2010 | Wheeler |
| 7,805,043 B2 | 9/2010 | Puetz et al. |
| 7,822,313 B2 | 10/2010 | Rapp et al. |
| 7,983,521 B2 | 7/2011 | Rapp et al. |
| 8,019,192 B2 | 9/2011 | Puetz et al. |
| 8,139,913 B2 | 3/2012 | Bolster et al. |
| 2002/0034290 A1 | 3/2002 | Pershan |
| 2002/0150372 A1 | 10/2002 | Schray |
| 2002/0181893 A1 | 12/2002 | White et al. |
| 2003/0002812 A1 | 1/2003 | Lampert |
| 2003/0007767 A1 | 1/2003 | Douglas et al. |
| 2003/0095772 A1 | 5/2003 | Solheid et al. |
| 2003/0147597 A1 | 8/2003 | Duran |
| 2003/0165315 A1 | 9/2003 | Trebesch et al. |
| 2003/0174996 A1 | 9/2003 | Henschel et al. |
| 2003/0223724 A1 | 12/2003 | Puetz et al. |
| 2004/0074852 A1 | 4/2004 | Knudsen et al. |
| 2004/0126069 A1 | 7/2004 | Jong et al. |
| 2004/0165852 A1 | 8/2004 | Erwin et al. |
| 2004/0228598 A1 | 11/2004 | Allen et al. |
| 2004/0264873 A1 | 12/2004 | Smith et al. |
| 2005/0002633 A1 | 1/2005 | Solheid et al. |
| 2005/0003697 A1 | 1/2005 | Neer et al. |
| 2005/0048831 A1 | 3/2005 | Neer et al. |
| 2005/0129379 A1 | 6/2005 | Reagan et al. |
| 2006/0029353 A1 | 2/2006 | Bolster et al. |
| 2006/0093274 A1 | 5/2006 | Kahle et al. |
| 2006/0093301 A1 | 5/2006 | Zimmel et al. |
| 2006/0210229 A1 | 9/2006 | Scadden |
| 2006/0228086 A1 | 10/2006 | Holmberg et al. |
| 2006/0269205 A1 | 11/2006 | Zimmel |
| 2006/0269206 A1 | 11/2006 | Zimmel |
| 2007/0047893 A1 | 3/2007 | Kramer et al. |
| 2007/0189692 A1* | 8/2007 | Zimmel et al. ............ 385/135 |
| 2008/0008436 A1 | 1/2008 | Reagan et al. |
| 2008/0008437 A1 | 1/2008 | Reagan et al. |
| 2008/0019655 A1 | 1/2008 | Vongseng et al. |
| 2008/0025684 A1 | 1/2008 | Vongseng et al. |
| 2008/0317425 A1 | 12/2008 | Smith et al. |
| 2009/0074372 A1 | 3/2009 | Solheid et al. |
| 2009/0087157 A1 | 4/2009 | Smith et al. |
| 2009/0190896 A1 | 7/2009 | Smith et al. |
| 2009/0196565 A1 | 8/2009 | Vongseng et al. |
| 2009/0285540 A1 | 11/2009 | Reagan et al. |
| 2009/0290843 A1 | 11/2009 | Reagan et al. |
| 2009/0297111 A1 | 12/2009 | Reagan et al. |
| 2010/0322577 A1 | 12/2010 | Bolster et al. |
| 2011/0317973 A1 | 12/2011 | Rapp et al. |

FOREIGN PATENT DOCUMENTS

| | | |
|---|---|---|
| CN | 2426610 Y | 4/2001 |
| DE | 27 35 106 A1 | 2/1979 |
| DE | 33 08 682 A1 | 9/1984 |
| DE | 42 07 531 A1 | 9/1992 |
| DE | 42 29 510 A1 | 3/1994 |
| EP | 0 146 478 A2 | 6/1985 |
| EP | 0 149 250 A2 | 7/1985 |
| EP | 0 196 102 A2 | 10/1986 |
| EP | 0 211 208 A1 | 2/1987 |
| EP | 0 293 183 A2 | 11/1988 |
| EP | 0 349 290 A1 | 1/1990 |
| EP | 0 406 151 A2 | 1/1991 |
| EP | 0 479 226 A1 | 4/1992 |
| EP | 0 196 102 B1 | 3/1993 |
| EP | 0 538 164 A1 | 4/1993 |
| EP | 0 585 809 A1 | 3/1994 |
| EP | 0 697 610 A1 | 2/1996 |
| EP | 0 743 701 A2 | 11/1996 |
| EP | 0 788 002 A1 | 8/1997 |
| EP | 0 871 047 A1 | 10/1998 |
| EP | 0 975 180 A1 | 1/2000 |
| EP | 1 045 267 A1 | 10/2000 |
| FR | 2 531 576 A1 | 2/1984 |
| FR | 2 587 127 A1 | 3/1987 |
| JP | 59-74523 | 4/1984 |
| JP | 60-169811 | 9/1985 |
| JP | 61-55607 | 3/1986 |
| JP | 61-90104 | 5/1986 |
| JP | 63-229409 | 9/1988 |
| JP | 1144266 S | 6/2002 |
| JP | 3307618 B2 | 7/2002 |
| JP | 3761762 B2 | 3/2006 |
| WO | WO 91/10927 | 7/1991 |
| WO | WO 95/20175 | 7/1995 |
| WO | WO 98/53347 | 11/1998 |
| WO | WO 99/27404 | 6/1999 |
| WO | WO 00/05611 | 2/2000 |
| WO | WO 00/07053 | 2/2000 |
| WO | WO 00/52504 | 9/2000 |
| WO | WO 00/75706 | 12/2000 |
| WO | WO 02/21182 | 3/2002 |
| WO | WO 02/103429 | 12/2002 |
| WO | WO 03/093883 A2 | 11/2003 |

OTHER PUBLICATIONS

"ADC OMX 600 Optical Distribution Frame Solution," *ADC Telecommunications, Inc.*, Publication No. 856, 8 pgs. (Feb. 2000).

"OMX™ 600 Optical Distribution Frame," *ADC Telecommunications, Inc.*, Publication No. 854, front cover, table of contents, pp. 1-13, rear cover (Apr. 2000).

21 photographs showing what AFL Telecommunications LLC purports to be the ECOE cabinet referenced in the Prior art statement and the Supplemental prior art statement listed above. AFL Telecommunications LLC asserts the cabinet was on sale as early as 2001.

24 photos of LambdaUnite® Blank Card; "LambdaUnite® MultiService Switch (MSS)" brochure (2003); and "Lucent's LambdaUnite® Busts Out" official release (Jan. 29, 2002) (33 pages total).

ADC Telecommunications brochure entitled "Next Generation Frame (NGF) Product Family Ordering Guide," 21 pages, dated Oct. 1998.

ADC Telecommunications brochure entitled "FL2000 Products," 48 pages, dated Nov. 1996.

ADC Telecommunications brochure entitled "Fiber Cable Management Products, Second Edition," 144 pages, dated Oct. 1995.

ADC Telecommunications, Inc., brochure titled *Value-Added module System*, © 2000 (29 pages).

ADC Telecommunications, Inc., brochure titled *Value-Added module System: Optical Distribution Frame (OMX™ 600)*, © 2001 (11 pages).

ADC Telecommunications, Inc.'s 2nd Edition of Fiber Panel Products; front cover, Table of Contents, pp. 1-111, and back cover; Item No. 846 (revised Jul. 1996).

ADC Telecommunications, Inc.'s 6th Edition of Next Generation Frame (NGF) Product Family Ordering Guide; front cover, Table of Contents, pp. 1-41, and back cover; Item No. 820 (revised Feb. 2003).

ADC Telecommunications, Inc.'s Fiber Optic, Cable Assemblies and Accessories Brochure; front cover, Table of Contents; pp. 1-23, and back cover; Item No. 100300 (revised Apr. 2003).

ADC Telecommunications, Inc.'s Secure Fiber Entrance Terminal (SFET) Brochure; front cover, pp. 2-7, and back cover; Item No. 1005 (revised May 1998).

ADC Telecommunications, Inc.'s Outside Plant, Fiber Cross-Connect Solutions Products Brochure; front cover, Table of Contents, pp. 1-48, and back cover, Item No. 1047 (revised Jun. 2002).

AMP Inc. catalog entitled "Fiber Optic Products," front and back covers and p. 59, (4 pgs.) ( © 1991).

Assembly reference drawings having drawing No. 1067101, dated Aug. 17, 1999 (8 pages).

AT&T Network Systems catalog entitled "Fiber Optic Products Innovation for wide ranging applications," front and back covers and pp. 6-1 through 6-16 (18 pages total) ( © 1995).

ATI Optique Catalog, ATI Optique Division of TI electronique, Version 2.6, released Mar. 27, 2002 (50 pages).

Brochure from Amphenol Corp. entitled "Amphenol® 954 Series one piece SC Connector," 2 pgs. (1990).

Connectorized splitter drawings having drawing No. 1067961, dated Aug. 18, 1999 (2 pages).

*Couplers: Couplers WDMS Packaging*, Alcoa Fujikura Ltd., Telecommunications Division, © 2000 (5 pages) showing AFL splitters.

Fiber distribution drawings having drawing No. 1069967, dated Aug. 17, 1999 (2 pages).

FONS Corporation's MDC Series Rack or Wall Mount Enclosures product sheet, 3 pages, (2002).

FONS Corporation's Modular Distribution Cabinets Rack Mount Enclosures, Model MDC-7, product sheet, 2 pages (2005).

FONS Corporation's Technical Drawing No. 11669, Rev. D, of Distribution Cabinet Assembly MFDC-7, 1 page (technical drawing depicting the device shown in Exhibit M).

Hasegawa et al., *100GHz-48CH Athermal AWG with a Novel Temperature Insensitive Principle*, National Fiber Optics Engineers Conference, 2003 Technical Proceedings, pp. 801-808.

HRS catalog entitled "Optical Fibre Connectors," front and back covers and pp. 16, 17 and 49 (5 pages) (Mar. 1991).

Installation drawings having drawing No. 1069965, dated Aug. 14, 1999 (3 pages).

Iwano, S. et al., "MU-type Optical Fiber Connector System," *NTT Review*, vol. 9, No. 2, pp. 63-71 (Mar. 1997).

Nexans, Cross-Connect Cabinet III: Plastic Watertight Cabinet for FTTH Applications, dated 2002 (2 pages).

Nexans, Cross-Connect Cabinet V: Metallic Watertight Cabinet for FTTH Applications, dated 2002 (2 pages).

NTT Int'l Fiber Termination Module (FTM) & Premises Optical Distribution Cabinets (PODC) product brochure, 3 pages, undated.

Optical fiber coupler review, Technical Report 2001, showing Sumitomo Osaka Cement Co. Ltd's Optical Coupler (pp. 41-42).

Sugita, E. et al., "SC-Type Single-Mode Optical Fiber Connectors," *Journal of Lightwave Technology*, vol. 7, No. 11, pp. 1689-1696 (Nov. 1989).

Tachikura et al., *Newly Developed Optical Fiber Distribution System and Cable Management in Central Office*, International Wire & Cable Symposium, Proceedings of the $50^{th}$ IWCS, pp. 98-105.

ADC Telecommunications Next Generation Frame Product Family, dated Dec. 2000.

ADC Telecommunications, Inc., 600 mm Products copied brochure, Value-Added Module System, pp. 53-78 (Oct. 2003).

ADC Telecommunications, Inc., copied product brochure, Fiber Management Tray, pp. 1-8 (Mar. 2003).

ADC Telecommunications, Inc., FMT Micro Value Added Monitor Module Configuration Scheme, pp. 1-2 (Feb. 6, 2003).

ADC Telecommunications, Inc., Mini VAM Connector Cleaning Instructions, ADCP-90-412, Issue 3, pp. 1-8 (Sep. 2002).

ADC Telecommunications, Inc., Mini VAM Splitter Mod (Installation Drawing), Drawing No. 1128185, technical drawing of the VAM pictured in Exhibit D, 2 pages (Mar. 14, 2001).

ADC Telecommunications, Inc., Next Generation Frame (NGF) Product Tour, Value Added Modules (VAMs), Copyright 2003, 1 page, (admitted as offered for sale as of Apr. 25, 2006).

AT&T Product Bulletin 2987D-DLH-7/89, Issue 2, 4 pages (Copyright 1989).

Installation Instructions for 12-position Splice Protector Insert from Corning Cable Systems, SRP-001-276, Issue 4, Jul. 2001, 1 page.

Jumper Routing Procedure for Enhanced Management Frame, Corning Cable Systems, SRP-003-599, Issue 2, Apr. 2002, 4 pages.

Northern Telecom Bulletin #91-004, Issue #2, 16 pages (May 1991).

Precision Mechanical, in Chinese with English Translation, 5 pages (publicly known at least as early as Aug. 2002).

Preface to the book "Structure, Installation, Connection and Protection of Communication Optical Fiber Cable," in Chinese with English Translation, 14 pages (Mar. 1992).

* cited by examiner

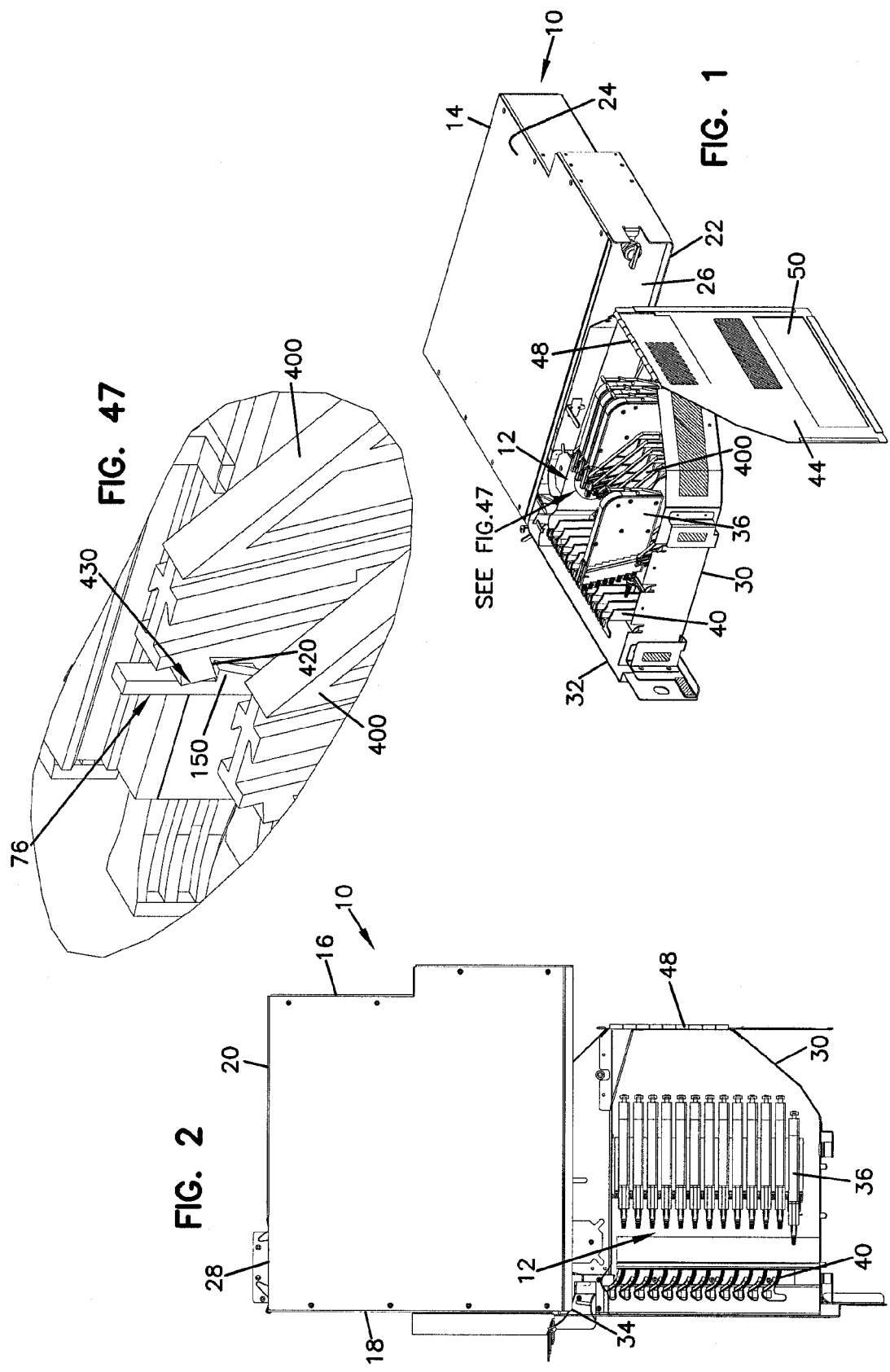

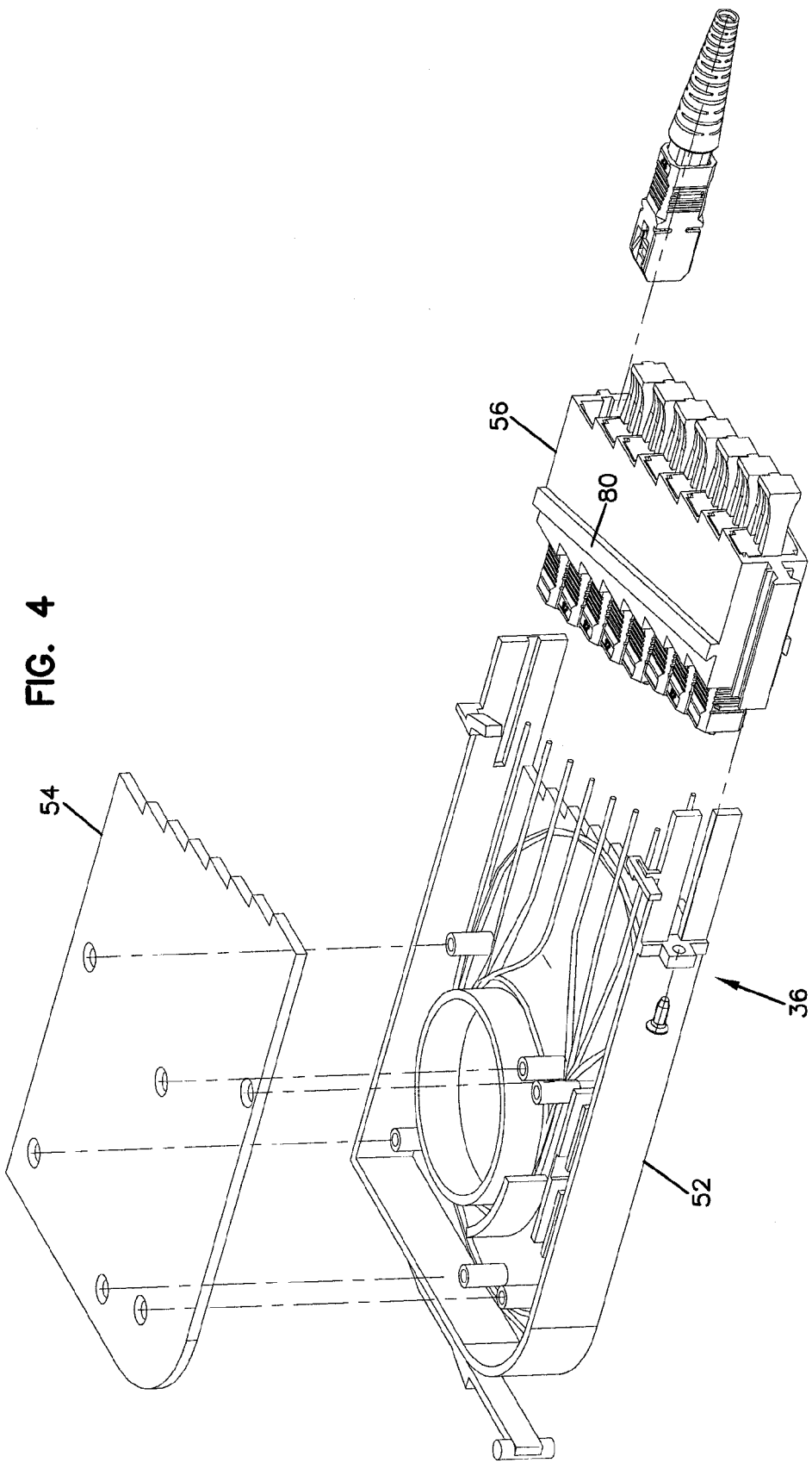

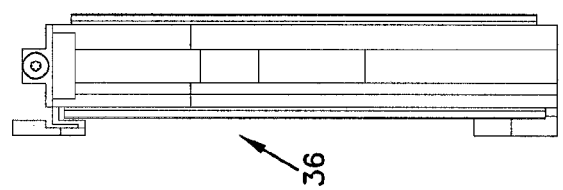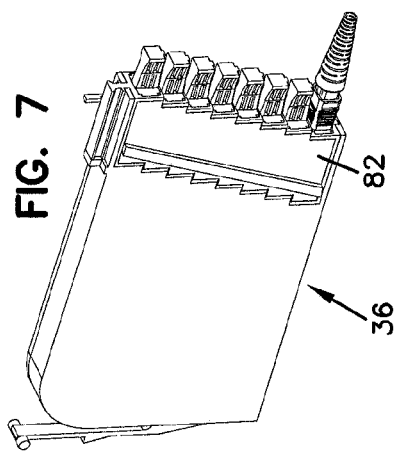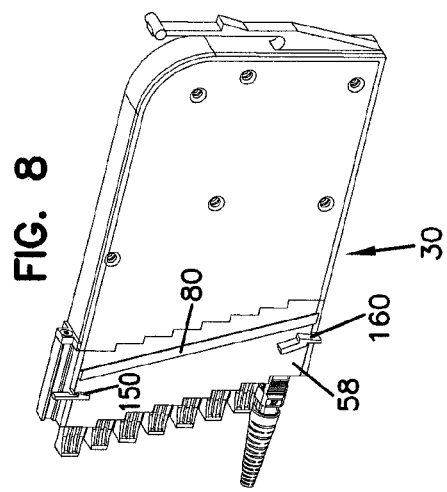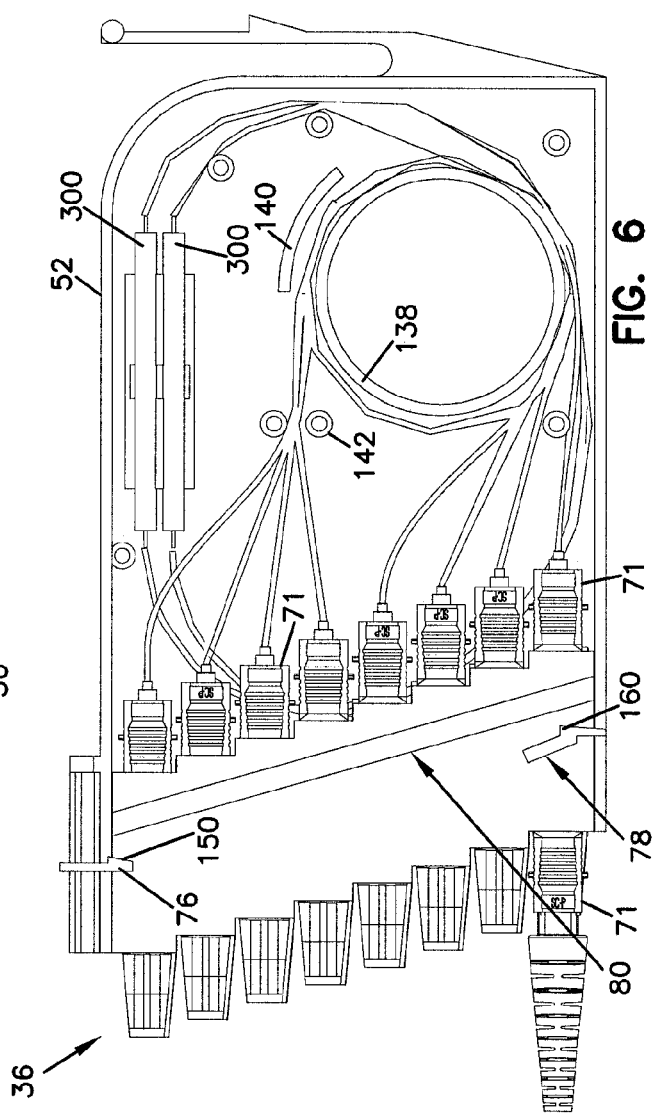

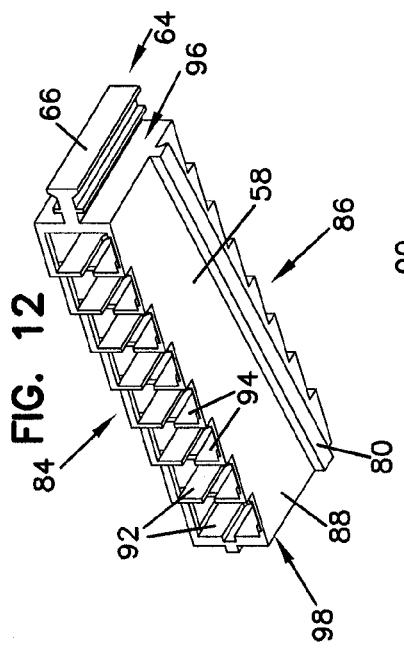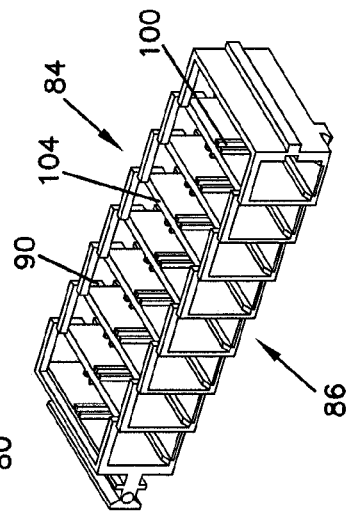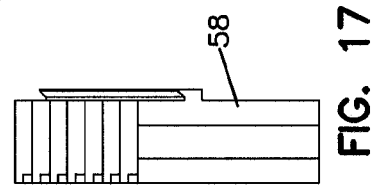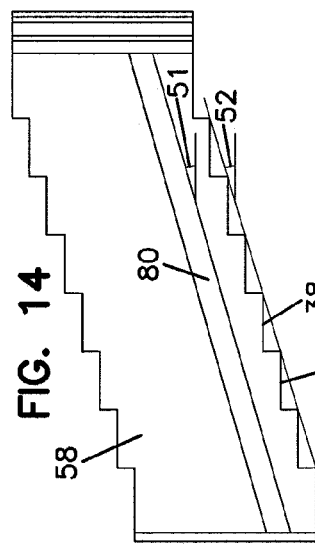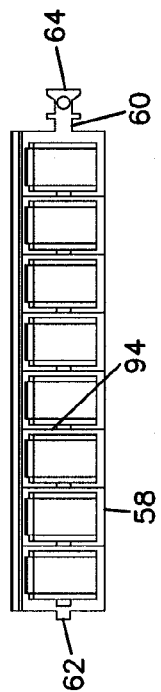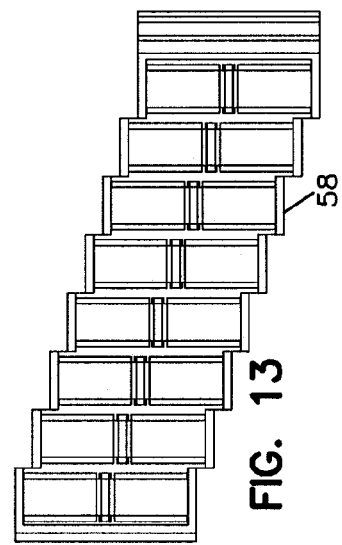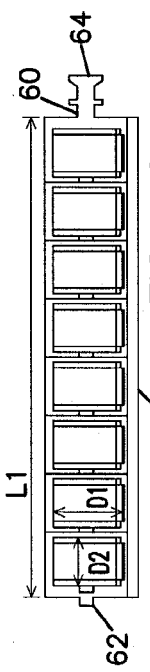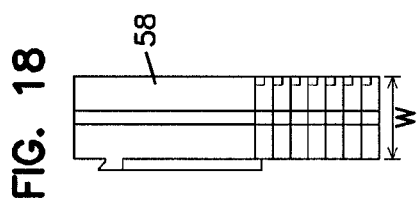

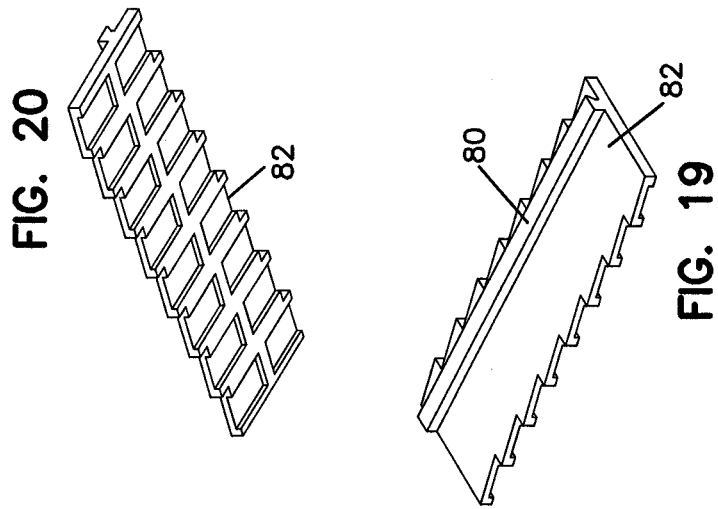
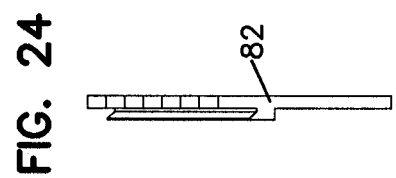
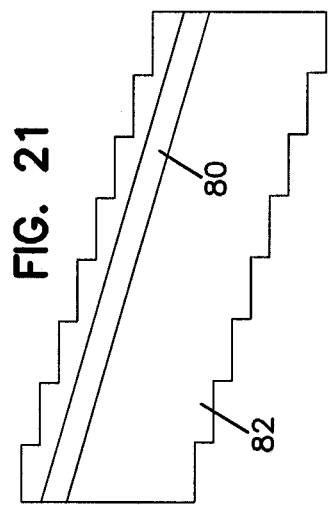
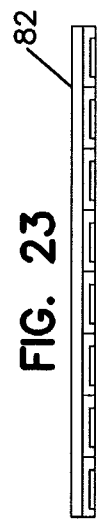
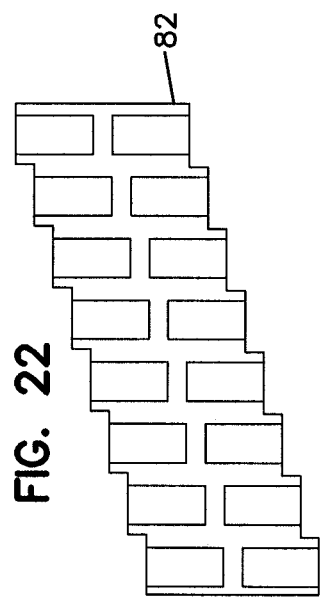
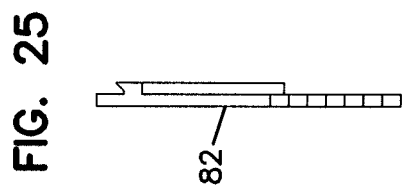

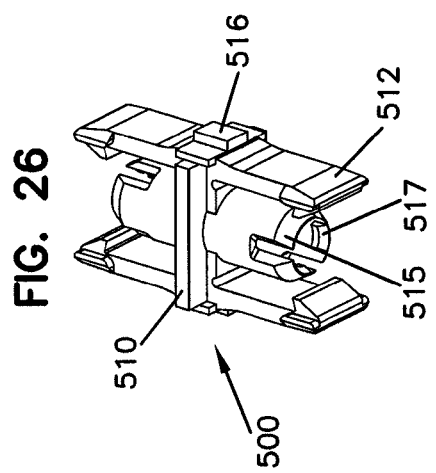
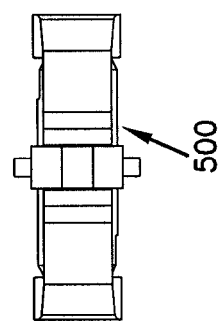
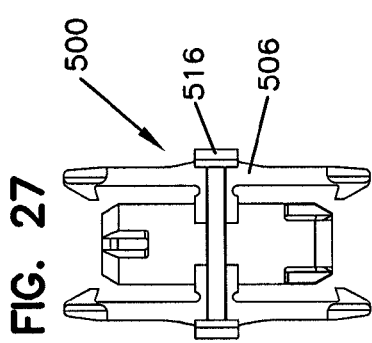
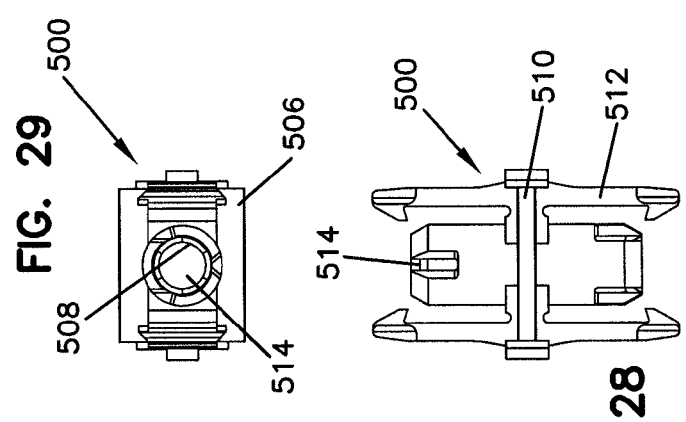
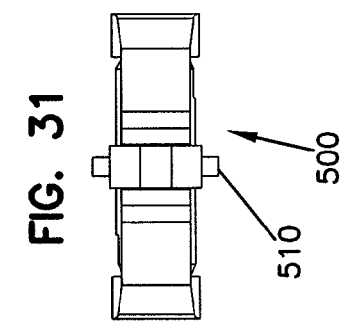

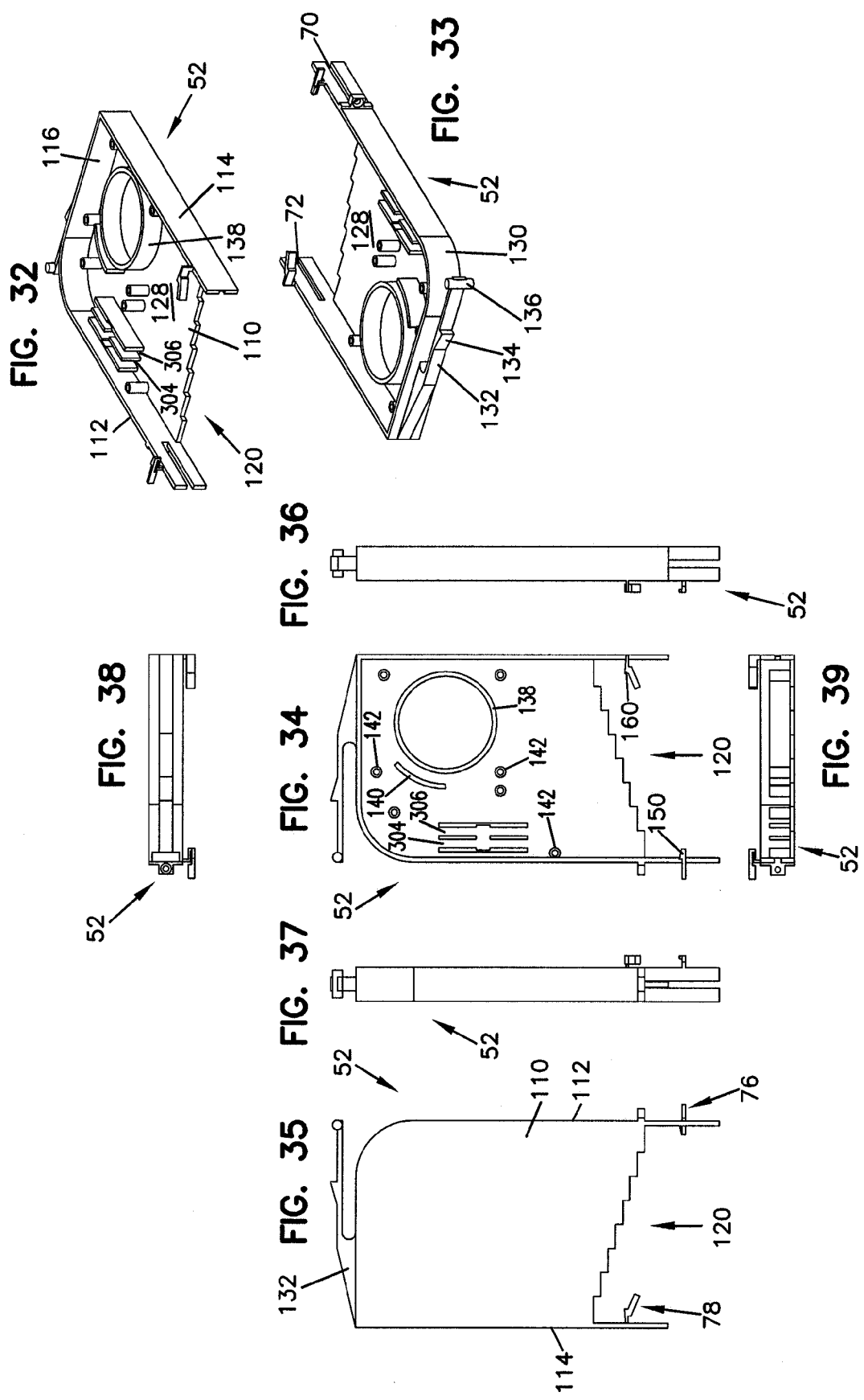

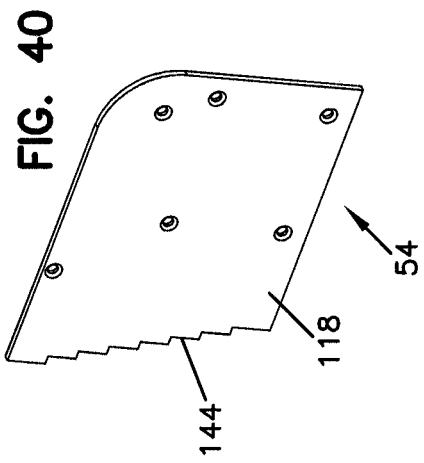
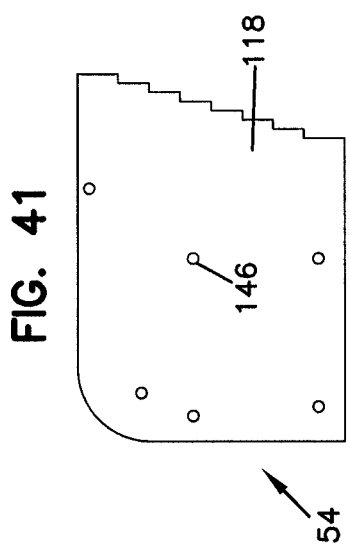
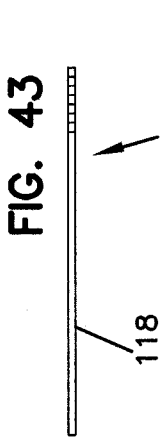
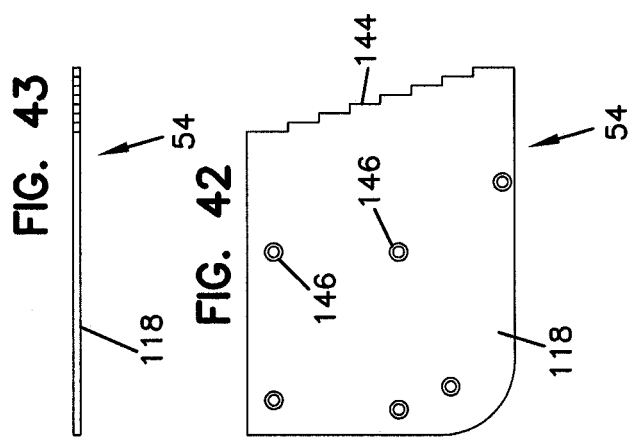
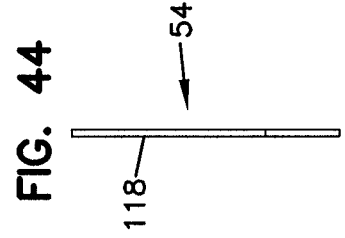

FIBER OPTIC TELECOMMUNICATIONS MODULE

CROSS REFERENCE TO RELATED APPLICATION(S)

This application claims priority to provisional application Ser. No. 61/116,973, filed Nov. 21, 2008, which application is incorporated herein by reference in its entirety.

FIELD

The present disclosure generally relates to fiber optic telecommunications equipment. More specifically, the present disclosure relates to fiber optic modules.

BACKGROUND

In fiber optic telecommunications systems, it is common for optical fibers of transmission cables to be split into multiple strands. Further, when such systems are installed, it is known to provide excess capacity in the installations to support future growth and utilization of the fibers. Often in these installations, modules including splitters may be used to provide the connection between transmission fibers and customer fibers. To reduce the cost and complexity of the initial installation and still provide options for future expansion, a module mounting panel capable of mounting multiple modules may be used in such an installation.

These panels may be configured with limited access to one or more sides, or may be mounted in cramped locations. In addition, some of these panels may be pre-configured with the maximum capacity of transmission cables to accommodate and link to modules which may be installed in the future. Since it is desirable to have access to components within the panel, some provision or feature of the panel may desirably permit a user to access the connectors of these pre-connectorized and pre-installed transmission cables.

While the demand for added capacity in telecommunications is growing rapidly, this demand is being met in part by increasing the density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

Further improvements in adding fiber optic capacity and increasing density while achieving accessibility are desired.

SUMMARY

The present disclosure relates to a fiber optic telecommunications device. The telecommunications device is a module including a plurality of adapters mounted thereon and at least one optical component within the module. The adapters define generally a block of adapters for optically connecting fiber optic cables terminated with connectors. The block defines a plurality of openings for forming an integral array of adapters.

In one embodiment, the openings forming the array of adapters are separated by walls shared by adjacent adapters allowing the overall length of the adapter array to be reduced.

According to one inventive aspect, the module is configured for slidable movement relative to a fixture to which it is mounted for providing access to the array of adapters and connectors and the optical components within the module.

According to another inventive aspect, the module includes a main housing with an optical component within an interior of the main housing and a fiber optic adapter block coupled to the main housing. The adapter block includes a one-piece main body including a top wall and a bottom wall, the adapter block defining a plurality of openings extending from a front end to a rear end of the main body, each opening defining a separate adapter, each opening defining a longitudinal axis, the adapters being configured to receive connectorized cables extending from the optical component within the interior of the main housing. The adapter block includes at least one guide rail extending generally between the top wall and the bottom wall, the guide rail configured for slidably mounting the fiber optic telecommunications module to a telecommunications device once the adapter block has been coupled to the main housing. The main housing includes an integrally formed pivotable latching arm configured to pivot for selectively latching and unlatching the telecommunications module for slidable movement with respect to the telecommunications device.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the disclosure and together with the detailed description, serve to explain the principles of the invention. A brief description of the drawings is as follows:

FIG. 1 is a front perspective view of a telecommunications termination panel according to the disclosure, the termination panel shown with a tray of the panel swung to an open position allowing access to the connection locations within the panel;

FIG. 2 is a top view of the termination panel of FIG. 1;

FIG. 4 is an exploded view of a telecommunications module configured to be inserted into the termination panel shown in FIGS. 1-3;

FIG. 6 illustrates a right side view of the telecommunications module of FIG. 5 in an assembled configuration, the telecommunications module shown without its cover to illustrate the internal features thereof;

FIG. 7 illustrates a front perspective view of the telecommunications module of FIG. 4 in a fully assembled configuration;

FIG. 8 is a rear perspective view of the telecommunications module of FIG. 7;

FIG. 9 is a rear view of the telecommunications module of FIG. 7;

FIG. 11 is a left side perspective view of the main body of the fiber optic adapter block of FIG. 10;

FIG. 12 is a front perspective view of the main body of the fiber optic adapter block of FIG. 10;

FIG. 13 is a left side view of the main body of the fiber optic adapter block of FIG. 10;

FIG. 14 is a right side view of the main body of the fiber optic adapter block of FIG. 10;

FIG. 15 is a rear view of the main body of the fiber optic adapter block of FIG. 10;

FIG. 16 is a front view of the main body of the fiber optic adapter block of FIG. 10;

FIG. 17 is a top view of the main body of the fiber optic adapter block of FIG. 10;

FIG. 18 is a bottom view of the main body of the fiber optic adapter block of FIG. 10;

FIG. 19 is a left side perspective view of the cover panel of the fiber optic adapter block of FIG. 10;

FIG. 20 is a right side perspective view of the cover panel of the fiber optic adapter block of FIG. 19;

FIG. 21 is a left side view of the cover panel of the fiber optic adapter block of FIG. 19;

FIG. 22 is a right side view of the cover panel of the fiber optic adapter block of FIG. 19;

FIG. 23 is a front view of the cover panel of the fiber optic adapter block of FIG. 19;

FIG. 24 is a bottom view of the cover panel of the fiber optic adapter block of FIG. 19;

FIG. 25 is a top view of the cover panel of the fiber optic adapter block of FIG. 19;

FIG. 26 is a perspective view of a connector ferrule alignment structure configured to be inserted into the main body of the fiber optic adapter block of FIG. 10;

FIG. 27 is a top view of the ferrule alignment structure of FIG. 26;

FIG. 28 is a bottom view of the ferrule alignment structure of FIG. 26;

FIG. 29 is a front view of the ferrule alignment structure of FIG. 26;

FIG. 30 is a left side view of the ferrule alignment structure of FIG. 26;

FIG. 31 is a right side view of the ferrule alignment structure of FIG. 26;

FIG. 32 is a front perspective view of a main housing portion of the telecommunications module of FIG. 5;

FIG. 33 is a rear perspective view of the main housing portion of the telecommunications module of FIG. 32;

FIG. 34 is a right side view of the main housing portion of the telecommunications module of FIG. 32;

FIG. 35 is a left side view of the main housing portion of the telecommunications module of FIG. 32;

FIG. 36 is a bottom view of the main housing portion of the telecommunications module of FIG. 32;

FIG. 37 is a top view of the main housing portion of the telecommunications module of FIG. 32;

FIG. 38 is a rear view of the main housing portion of the telecommunications module of FIG. 32;

FIG. 39 is a front view of the main housing portion of the telecommunications module of FIG. 32;

FIG. 40 is a rear perspective view of the cover of the telecommunications module of FIG. 5;

FIG. 41 is a left side view of the cover of FIG. 40;

FIG. 42 is a right side view of the cover of FIG. 40;

FIG. 43 is a bottom view of the cover of FIG. 40;

FIG. 44 is a rear view of the cover of FIG. 40;

FIG. 47 is an enlarged portion of the perspective view of FIG. 1; and

DETAILED DESCRIPTION

Reference will now be made in detail to exemplary aspects of the present disclosure which are illustrated in the accompanying drawings. Wherever possible, the same reference numbers will be used throughout the drawings to refer to the same or similar parts.

Figure 3:
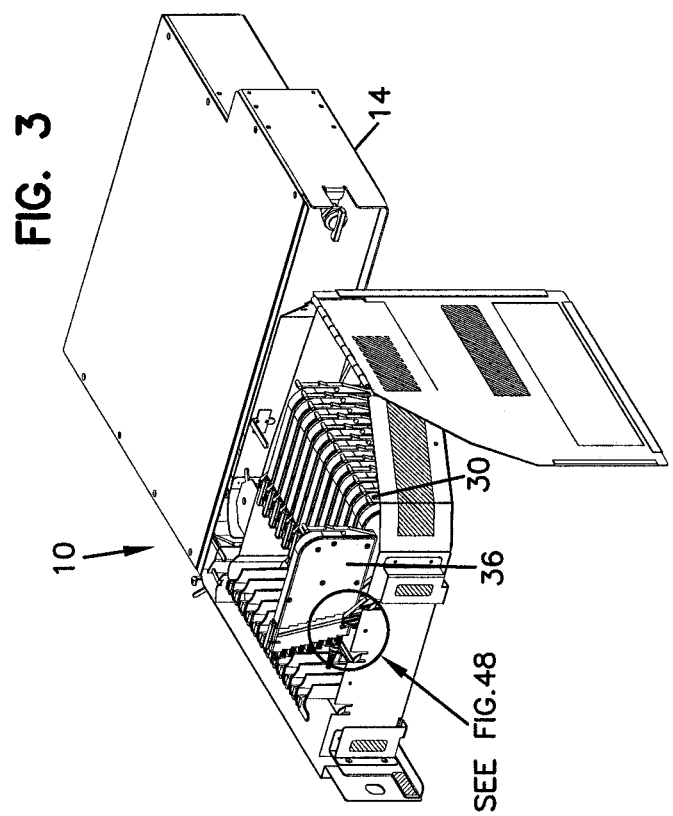
FIG. 3 is another front perspective view of the termination panel of FIG. 1.

Referring now to FIGS. 1-3, a telecommunications termination panel 10 is illustrated. The termination panel 10 is similar in construction and functionality to the termination panels illustrated and described in U.S. Pat. Nos. 7,086,539; 7,090,084; 6,870,734; 7,102,884; 7,408,769; and U.S. Provisional Application Ser. No. 61/044,356, entitled "FIBER MANAGEMENT PANEL", filed Apr. 11, 2008, the entire disclosures of which are incorporated herein by reference.

Referring now to the FIGS. 1-3, the telecommunications termination panel 10 provides a plurality of connection locations 12 for linking telecommunications cables within the panel 10. These types of termination panels may optically connect optical fiber cables at the connection locations 12. A panel such as the panel 10 shown in FIGS. 1-3 may be mounted to a telecommunications equipment rack adjacent other panels or other telecommunications equipment. The panel 10 may be mounted to a standard nineteen inch wide rack. In other embodiments, the panel may be adapted to be mounted on a twenty-three inch wide rack or to racks of other widths.

Referring to FIGS. 1-3, the termination panel 10 includes a housing 14 made up of a first sidewall 16, a second sidewall 18, a rear wall 20, and a bottom wall 22. A top wall 24 cooperates with the first sidewall 16, the second sidewall 18, the rear wall 20, and the bottom wall 22 to define a front opening 26 and a rear opening 28 of the housing 14. The rear wall 20 is configured to substantially close off the rear of the panel 10 except for the rear opening 28.

Still referring to FIGS. 1-3, the panel 10 includes a pivoting tray 30 movable between an open position and a closed position. The tray 30 includes a front wall 32 that substantially closes off the front opening 26 of the panel 10 when the tray 30 is in the closed position. The tray 30 pivots about an axis defined by a hinge 34 adjacent the second sidewall 18.

The tray 30 houses the plurality of connection locations 12 for aligning and optically linking incoming fiber optic cables with outgoing fiber optic cables. As will be described herein in further detail, the connection locations 12 may define a plurality of telecommunications modules 36 that include adapters 38 and other optical components. The type of optical components housed within the modules 36 may depend upon the optical circuitry or connectivity desired. After the outgoing cables extend from the adapters 38 of the telecommunications modules 36, they pass through a plurality of vertically oriented fingers 40 which provide bend radius protection to the cables as cables are directed toward an exit opening of the tray 30, as described in further detail in U.S. Pat. Nos. 7,086, 539; 7,090,084; 6,870,734; 7,102,884; 7,408,769; and U.S. Provisional Application Ser. No. 61/044,356, entitled "FIBER MANAGEMENT PANEL", filed Apr. 11, 2008, the entire disclosures of which have been incorporated herein by reference.

As shown in FIGS. 1-3, each telecommunications module 36 is slidably mounted between a pair of wall structures 400 and may be extended generally upwardly above the tray 30. The walls 400 are shown in closer detail in FIGS. 45 and 46 and will be described in further detail below. The slidable interaction of the telecommunications modules 36 with the walls 400 are shown in the enlarged views of FIGS. 47 and 48 and will also be described in further detail below.

Thus positioned, access to the telecommunications modules 36 and to any optical fiber cables attached to the adapters 38 is improved. In the depicted embodiment, thirteen modules 36 are mounted on the tray 30. The walls 400 are configured to receive a sliding module 36 on each side, so that a total of fourteen walls 400 are required to support the thirteen modules 36.

In the depicted embodiment, the telecommunications modules 36 extend at an angle toward the front of the tray 30. The axis of insertion of connectorized fiber optic cables to the front and rear of each adapter 38 of the telecommunications modules 30 is substantially parallel to the floor of the tray 30. Alternatively, the walls 400 and the modules 36 could be configured so that the modules 36 slide vertically, with adapters 38 mounted horizontally to modules 36.

Still referring to FIGS. 1-3, the tray 30 includes a cover 44 hingedly mounted to a rear wall 46 of the tray 30 by a hinge 48. The cover 44 is movable between an operational (closed) position and an access (open) position. When the cover 44 is in an operational position, the tray 30 is allowed to be moved between the open and closed positions with respect to the panel 10. The cover 44 includes an opening 50 through which the modules 36 are visible. Opening 50 permits any identification or other information printed or attached to modules 36 to be visible when cover 44 is in the operational position.

The cover 44 is configured to prevent movement of the tray 30 to the closed position when cover 44 is not in the operational position. In this manner, any damage to the telecommunications modules 36, when they are in an extended position, is prevented.

The cover 44 is also configured such that, when in the operational position, the cover 44 will ensure that no cables within the tray 30 extend above the top surface of the tray 30. In this manner, any cables extending above the tray 30 are prevented from being pinched or otherwise damaged by the front edge of the top wall 24 of the housing 14.

The cover 44 also interacts with the telecommunications modules 36 which were extended upward and not retracted prior to cover 44 being moved from the access position. The upper end of an extended module 36 strikes the cover 44 adjacent an edge of the opening 50. The opening 50 is positioned and configured to prevent the cover 44 from being closed with a module 36 extended upward while still allowing visibility of modules 36 when the cover 44 is in the operational position. When a module 36 is extended and interacts with the cover 44, the cover 44 cannot be moved to the operational position and tray 30 cannot be closed. This prevents damage to extended modules 36 as described above. In FIGS. 1-3, one of the telecommunications modules 36 is illustrated in an extended position. Please refer to U.S. Pat. Nos. 7,086,539; 7,090,084; 6,870,734; 7,102,884; 7,408,769; and U.S. Provisional Application Ser. No. 61/044,356, entitled "FIBER MANAGEMENT PANEL", filed Apr. 11, 2008, the entire disclosures of which have been incorporated herein by reference, for further description on the operation of the cover 44 and other features of the termination panel 10 of FIGS. 1-3.

Referring now to FIGS. 4-9, one of the telecommunications modules 36 is shown in closer detail. The telecommunications module 36 includes a main housing portion 52 (shown in detail in FIGS. 32-39) and a cover portion 54 (shown in detail in FIGS. 40-44). A fiber optic adapter block 56 defining a plurality of integrally formed fiber optic adapters 38 (shown in detail in FIG. 10) is coupled to the main housing portion 52 of the telecommunications module 36.

Figure 5:
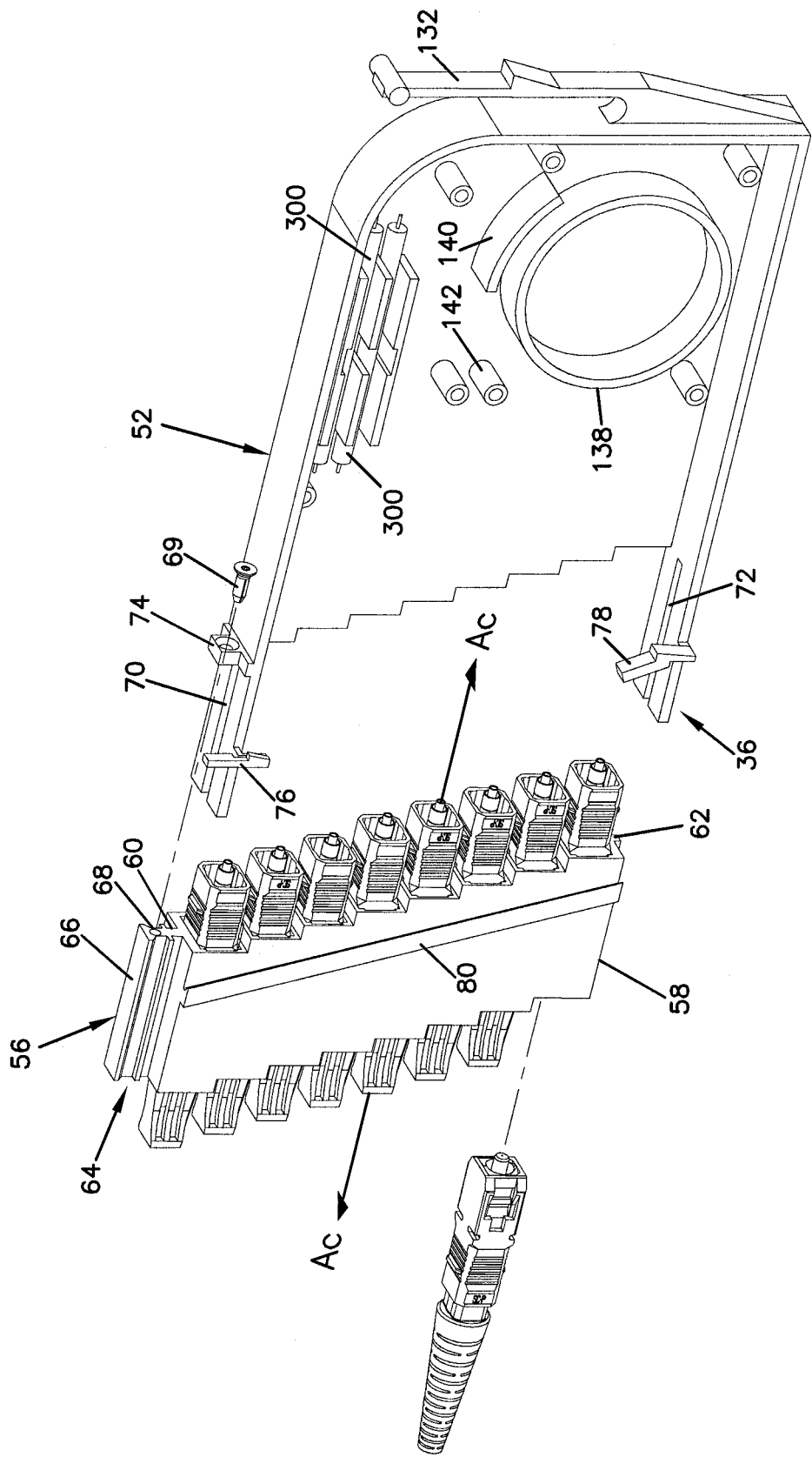
FIG. 5 illustrates a fiber optic adapter block of the telecommunications module of FIG. 4 exploded from the main housing portion of the module of FIG. 4.

In FIGS. 4 and 5, the telecommunications module 36 is shown in a partially exploded view, illustrating the coupling of the fiber optic adapter block 56 to the main housing 52 of the module 36. In FIGS. 6-9, the telecommunications module 36 is shown in an assembled configuration with the fiber optic adapter block 56 coupled to the main housing 52 of the module 36.

As shown in FIGS. 4-5, the fiber adapter block 56 defines a main body 58 that includes top and bottom guides 60, 62 parallel to the longitudinal axes $A_A$ of the integral adapters 38 formed therein. The top guide 60 is defined as a portion of a slide structure 64 located at the top of the main body 58. The slide structure 64 includes the top guide 60 and also a handle portion 66, the purpose of which will be described in further detail below. The slide structure 64 also includes an opening 68. The opening 68 is configured to receive a fastener 69 once the adapter block 56 is coupled to the main housing 52 of the module 36. The top and bottom guides 60, 62 are inserted into top and bottom slots 70, 72, respectively, defined adjacent the front of the main housing 52 of the telecommunications module 36 to slidably couple the adapter block 56 to the main housing 52. Once coupled, the fastener 69 is used to fasten the main housing 52 to the adapter block 56. As shown, the fastener 69 extends through a mounting flange 74 of the main housing 52 into the fastener opening 68 defined on the slide structure 64 of the adapter block 56.

As will be described in further detail below, the main housing 52 of the telecommunications module 36 includes an integrally formed, pivotal latching arm 76 adjacent the top of the module 36. The main housing 52 also includes an integrally formed, pivotal locking arm 78 adjacent the bottom of the module 36. The latching arm 76 and the locking arm 78 are located adjacent the front of the module main housing 52 and are positioned to cooperate with guide rails 80 defined on the adapter block 56 in providing slidability and lockability/latchability of the telecommunications module 36 with respect to the walls 400 of the termination panel 10.

Now referring to FIGS. 10-31, the fiber optic adapter block 56 and the features thereof are illustrated. The adapter block 56 shown in FIGS. 10-31 is configured to be coupled to the main housing 52 of the telecommunications module 36 and slide outwardly from the fiber termination panel 10 with the main housing 52 to provide selective access to the connectors 71 mounted therein and the optical component(s) within the module 36. In the depicted embodiment, the adapter block 56 is configured to slide at a non-perpendicular angle relative to the longitudinal axes $A_C$ of the connectors mounted on the block 56. Thus, as seen in FIGS. 10-25, the adapter block 56 depicted has a stepped configuration.

It should be noted that the adapter block 56 may be configured to slide in a direction generally perpendicular to the longitudinal axes $A_C$ of the connectors 71 mounted on the block 56 if desired. The following discussion, however, will focus on the angled sliding adapter block 56, it being understood that the following description is also fully applicable to a "straight" adapter block.

Referring now to FIGS. 10-25, the main body 58 of the adapter block 56 and the cover panel 82 are illustrated. The main body 58 defines a front end 84 and a rear end 86. The main body 58 defines a closed right side 88 and an open left side 90. The left side 90 of the main body 58 is closeable by the cover panel 82 after the internal features of the adapters 38 have been inserted into the main body 58. The main body 58 forms a block of adapters 38. The main body 58 defines a plurality of openings 92 that form an array of adapters 38 for receiving the connectors 71. The openings 92 are separated by walls 94. The array of adapters 38 are configured in a stacked arrangement extending from a top side 96 of the block 56 to the bottom side 98 of the block 56. The adapter openings 92 define longitudinal axes $A_A$ that are parallel to each other extending in a direction from the front end 84 to the rear end 86 of the main body 58.

In the example shown in FIGS. 10-18, the body 58 defines eight openings 92 which define eight integral adapters 38. It will be appreciated that any number of integral adapters 38 may be formed in the body 58 by varying the number of openings 92. It should also be noted that although the illustrated adapters 38 are configured to receive SC-type connectors 71, the body 58 can be designed to interconnect other types of connectors. In FIGS. 4-9, the sliding adapter block 56 is shown with a plurality of SC-type connectors 71 mounted in the adapter openings 92.

Still referring to FIGS. 10-25, as discussed above, the main body 58 of the adapter block 56 includes the top and bottom guides 60, 62 parallel to the longitudinal axes $A_A$ of the integral adapters 38. The top guide 60 is defined as a portion of the slide structure 64 located at the top of the main body 58. As noted above, the top and bottom guides 60, 62 are configured to be inserted into top and bottom slots 70, 72, respectively, defined adjacent the front of the main housing 52 of the telecommunications module 36 to slidably couple the adapter block 56 to the main housing 52. Once coupled, a fastener 69 is used to fasten the main housing 52 to the adapter block 56.

Referring to FIGS. 10-25, the main body 58 of the adapter block 56 and the cover panel 82 define guide rails 80 extending at an angle from the top of the block 56 to the bottom of the block 56. As will be described in further detail, the guide rails 80 are configured to cooperate with linear grooves 414 of the wall structures 400 to provide slidability of the block 56 relative to the termination panel 10. As shown, the slope 51 of the guide rails 80 is generally equal to a slope S2 formed by the array of adapters 38. In this manner, when the block 56 (along with the module 36) is slid with respect to the termination panel 10, the longitudinal axes $A_A$ of the adapters stay parallel with the floor of the termination panel 10. The slope S2 may be defined by a line connecting the same point on each of the adapters 38. For example, S2 may be formed by connecting the point of intersection of the front and top of each of the adapters as shown in FIG. 14.

As mentioned above, the block 56 of adapters 38 described herein is designed for SC-type connectors 71. Therefore, the inner configuration of the adapter openings 92 including the structure of the separating walls 94 are designed to accommodate ferrule alignment structures 500 for SC-type connectors 71.

In FIGS. 26-31, one of the ferrule alignment structures 500 configured to be inserted into the main body 58 of the fiber optic adapter block 56 is shown. The ferrule alignment structure 500 includes a sleeve mount 506 and a ferrule sleeve 508 that is designed to be inserted within the sleeve mount 506. The sleeve mount 506 is generally a one-piece design and is configured to receive an SC-type connector 71 from each end for interconnection.

The sleeve mount 506 includes lateral guides 510, latching hooks 512, an axial bore 514, and spacers 516. The sleeve mount 506 includes flexible arms 515 defined around the axial bore 514. The sleeve 508 is configured to be received within the axial bore 514 of the sleeve mount 506 wherein the flexible arms 515 flex out radially to receive the sleeve 508 with a snap fit arrangement. The flexible arms 515 include inwardly extending fingers 517 for holding the sleeve 508 within the axial bore 514 once the sleeve 508 is received within the bore 514 (see FIG. 29). The sleeve 508 can be inserted into the axial bore 514 from either end of the sleeve mount 506. The sleeve 508 may also include a slit for allowing the sleeve 508 to compress elastically, reducing its diameter during insertion into the axial bore 514. The latching hooks 512 are used for latching the SC-type connector housings to the adapters 38 as generally known in the art.

Figure 10:
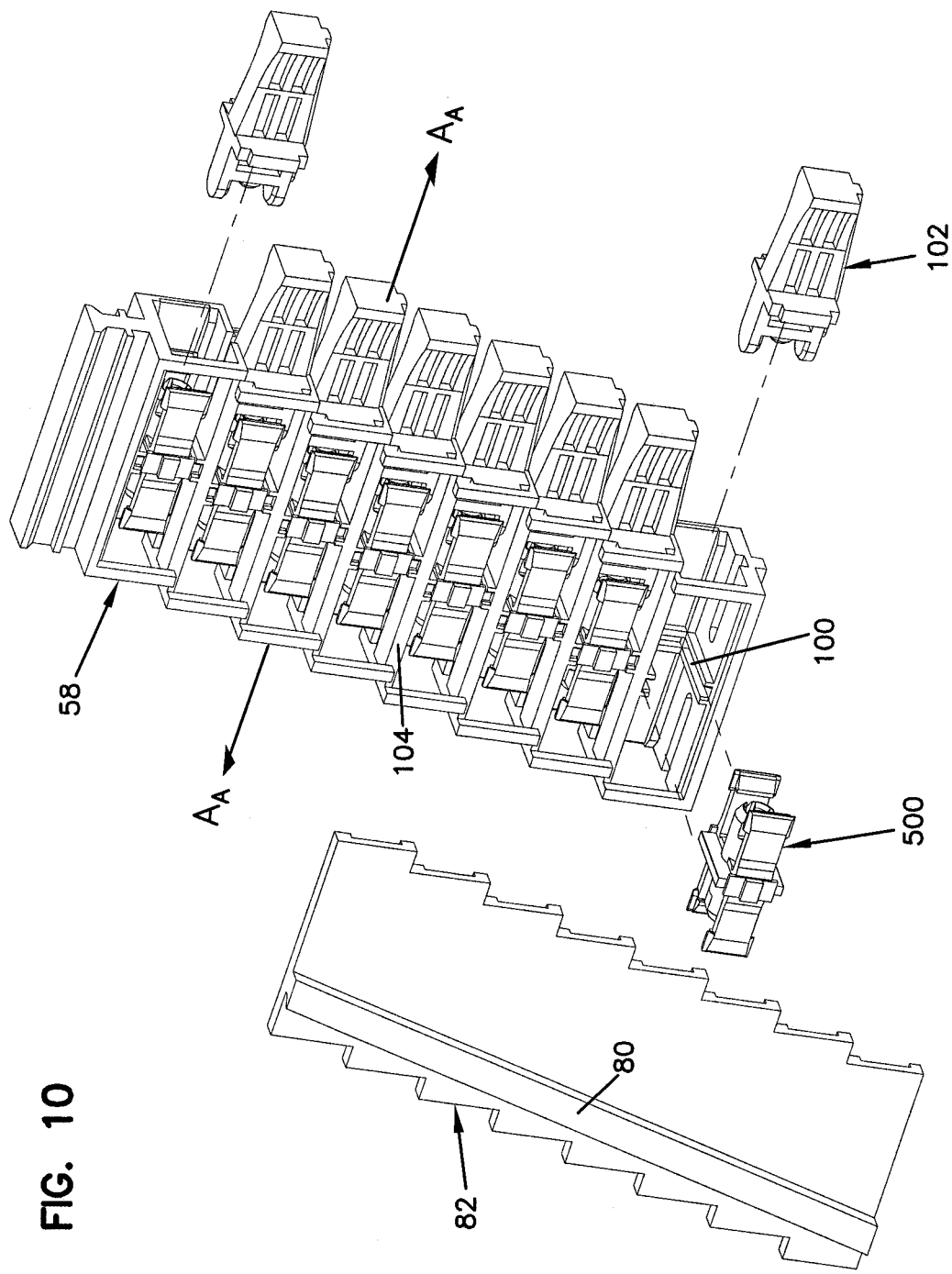
FIG. 10 is an exploded view of a fiber optic adapter block configured to be coupled to the main housing portion of the telecommunication module of FIGS. 4-9.

The lateral guides 510 are configured to slide within lateral slots 100 formed in each of the adapter openings 92 as shown in FIG. 10. Once all of the ferrule alignment structures 500 are inserted into the adapter openings 92 from the open side 90 of the block 56, the cover panel 82 is placed on the block 56 to close up the open side 90 of the main body 58. In one embodiment, the cover panel 82 may be ultrasonically welded to the main body 58 to capture the ferrule alignment structures 500 within the block 56. In FIG. 10, the block 56 is shown with a plurality of dust-caps 102 inserted into one end of the adapters 38.

Even though the sleeve mount 506 is depicted as a one-piece design, in other embodiment, the sleeve mount 506 could be provided in multiple pieces.

A one piece main body 58 and a one-piece sleeve mount 506 facilitate assembly and reduces manufacturing costs compared to multi-piece bodies and multi-piece sleeve mounts. Furthermore, the overall length of the array of adapters 38 from the top 96 to the bottom 98 of the block 56 can be reduced by providing a design where adjacent adapters 38 share a separating wall 94.

The adapter block 56, by being manufactured from a single-piece body 58 defining an integral array of adapters 38, can have reduced overall length, width, and height allowing for higher density of fiber terminations. For example, each adapter opening 92 includes a major dimension D1 and a minor dimension D2 wherein the major dimension D1 is greater than the minor dimension D2 (see FIG. 16). The body 58 is configured such that the openings 92 are lined up along their minor dimensions D2 forming a length L1 for the entire array of adapters 38 (see FIG. 10). The major dimension D1 is sized to generally correspond to the longer side of the rectangular face of an SC-type connector 71 and the minor dimension D2 is sized to generally correspond to the shorter side of the rectangular face of an SC-type connector 71, which are commonly known in the art. By aligning the minor dimensions D2 of the adapter openings 92 to form the array of adapters 38, the overall length L1 of the array of adapters 38 can be reduced relative to separately mounted adapters. As discussed previously, the configuration of the adapter walls 94 enables an adjacent adapter pair to share a common separating wall 94 and the openings 92 to be lined up along their minor dimensions D2 increasing the density of the adapters 38. In one embodiment, wherein the block defines eight adapter openings 92, L1 may be about 3 inches. In another embodiment, wherein the block defines eight adapter openings 92, L1 may be less than about 3.2 inches.

The cover panel 82 and the main body 58 are also constructed such that the cover panel 82 is received within a recess 104 defined on the left side 90 of the block 56 and lies flush with the outer perimeter of the block 56 to reduce the width W of the block 56.

Although in the embodiment described herein, the block 56 is configured for SC connectors 71, other blocks defining an integral array of various different kinds of adapters are also contemplated.

Now referring to FIGS. 32-39, the main housing portion 52 of the telecommunications module 36 is illustrated. The main housing 52 includes a first transverse sidewall 110 (i.e., a left sidewall) extending between a top wall 112, a bottom wall 114, and a rear wall 116. A removable cover portion 54 (shown in FIGS. 40-44) defines a second transverse wall 118 (i.e., right sidewall) of the telecommunications module 36 and closes off the open side 120 of the module main housing 52.

The front end 122 of the module main housing 52 defines an open end and is configured to receive the fiber optic adapter block 56 as discussed above. The top and bottom walls 112, 114 define the top and bottom slots 70, 72, respectively, adjacent the front end 122 of the main housing 52 of the telecommunications module 36. The slots 70, 72 receive the top and bottom guides 60, 62, respectively, of the adapter block 56 to slidably couple the adapter block 56 to the main housing 52. As discussed above, once coupled, a fastener 69 is used to fasten the main housing 52 to the adapter block 56. As shown, the main housing 52 includes a mounting flange 74 at the top wall 112 for receiving the fastener 69.

The front edges of the left sidewall 110 of the main housing 52 and the right sidewall 118 defined by the cover 54 include a stepped configuration to match that of the adapter block 56. The adapter block 56 is shown coupled to the main housing 52 in FIGS. 6-8. When the adapter block 56 is mounted to the module 36, the rear ends 113 of the adapters 38 face toward the interior 128 of the module 36 while the front ends 115 protrude away from the module 36. Once the cover 54 is attached to the main housing 52, the rear ends 113 of the adapters 38 of the block 56 are hidden within the interior 128 of the module 36.

As discussed above, the main housing 52 includes an integrally formed, pivotal latching arm 76 at the top wall 112 of the main housing 52. The main housing 52 also includes an integrally formed, pivotal locking arm 78 at the bottom wall 114 thereof. The latching arm 76 and the locking arm 78 are located adjacent the front of the module main housing 52 and are positioned to cooperate with the guide rails 80 defined on the adapter block 56 to provide slidability and lockability/latchability of the telecommunications module 36 with respect to the walls 400 of the termination panel 10, as will be described in detail below.

Still referring to FIGS. 32-39, the main housing portion defines a curved wall portion 130 adjacent the intersection of the top wall 112 and the rear wall 116. The curved portion 130 is configured to provide bend radius protection to any cables routed within the interior 128 of the main housing 52.

The rear wall 116 also includes a second latching arm 132. The second latching arm 132 is an optional structure of the module 36 and can be incorporated into the module 36 if the module 36 is needed to be mounted to a fixture in a direction extending generally from the top wall 112 toward the bottom wall 114 of the main housing 52. The optional latching arm 132 includes a second latching tab 134 and a second handle portion 136. The second handle portion 136 may be used to flex the second latch arm 132 to free the second latching tab 134 from a fixture.

Within the interior 128 of the main housing portion 52 is a first radius limiter 138 (e.g., a spool) adjacent the rear and bottom walls of the main housing 52. The main housing 52 also includes a curved wall structure 140 adjacent the first radius limiter 138 configured to act as a cable management structure for routing cables within the module 36 (see FIG. 6). The curved wall structure 140 is configured to keep fiber optic cables coiled around the first radius limiter 138, separate from the rest of the interior 128.

Referring to FIGS. 32-44, the cover 54 of the module 36 is mounted to the main housing 52 by fasteners through fastener mounts 142 defined on the main housing portion 52. The fastener mounts 142 may also act as cable management structures within the interior 128 of the main housing portion 52 as shown in FIG. 6.

The cover 54 defines a complementary structure to the main housing 52 and includes a front edge 144 with a stepped configuration. The cover 54 is configured to be fastened to the module main housing portion 52 to keep the internal components within the module main housing 52. The cover 54 defines fastening holes 146 for receiving fasteners (see FIGS. 40-44 for details of the cover 54 of the module 36).

As discussed above, the telecommunications module 36 can be used to house a variety of different types of optical equipment, depending upon the desired connectivity. Referring back to FIGS. 6 and 32-39, the embodiment of the telecommunications module 36 depicted herein is configured to house two fiber optic splitters 300 (i.e., fiber optic couplers) within the main housing 52. The main housing portion 52 includes an optical component mount 302 adjacent the top wall 112 of the main housing portion 52. In the depicted embodiment, the optical component mount 302 defines first and second cavities 304, 306 for receiving first and second fiber optic splitters 300. In the depicted example, the fiber optic splitters 300 may be 2×2 splitters. Once the fiber optic splitters 300 are placed within the main housing portion 52, they are captured therein by the cover 54.

Figure 6A:
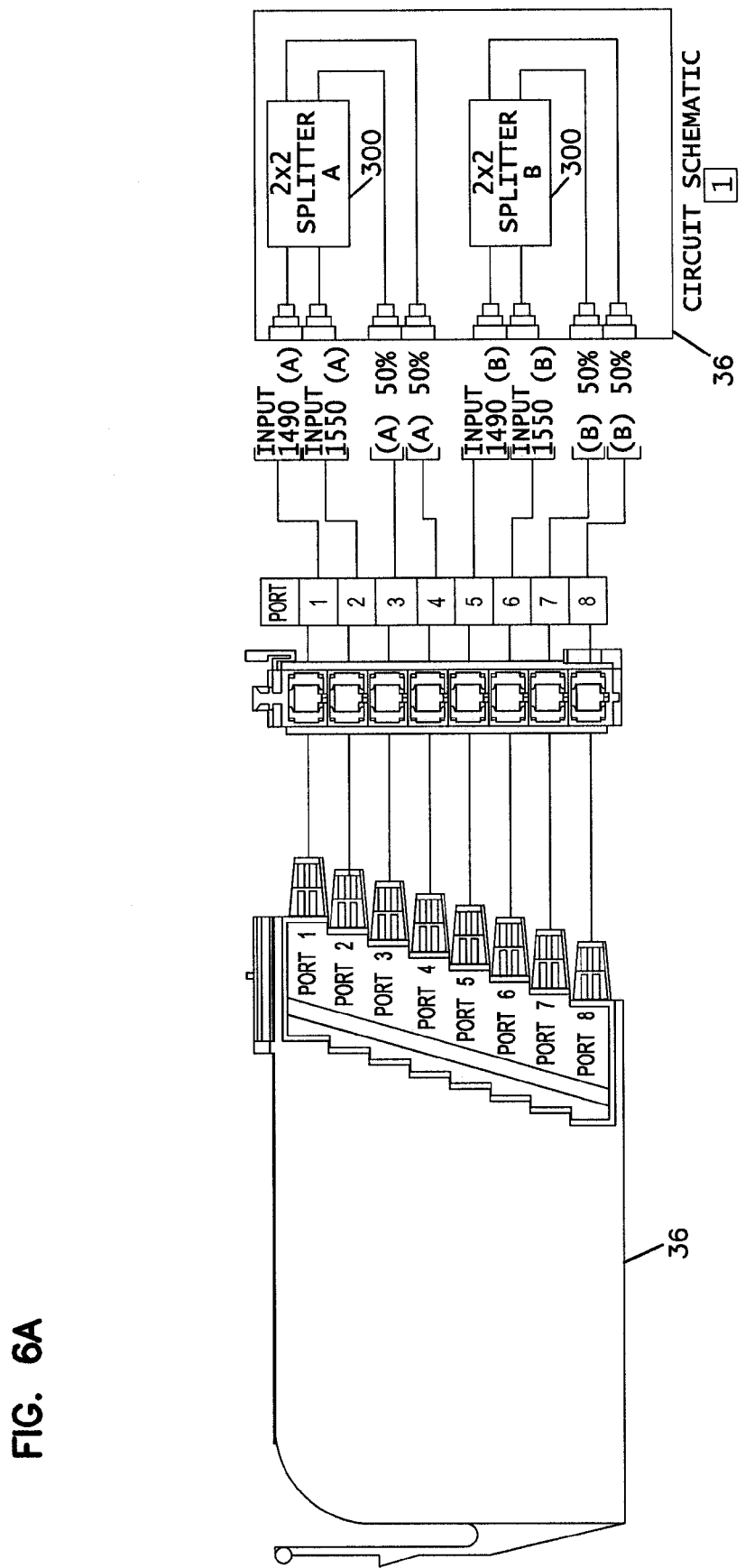
FIG. 6A is a diagrammatic view illustrating the adapter ports of the telecommunications module of FIG. 6 along with the fiber optic circuit schematic for the equipment housed within the telecommunications module of FIG. 6.

FIG. 6A shows a diagrammatic view of the telecommunications module 36 illustrating the adapter ports of the telecommunications module 36 of FIG. 6 along with an example fiber optic circuit schematic for the module 36. As shown in FIG. 6A, the two splitters 300 within the module main housing 52 may be used to provide for two different circuits within the module 36. According to one example, a first A signal having a first wavelength (1490 nm) and a second A signal having a second wavelength (1550 nm) may be input through ports 1 and 2 of the module 36 as shown in FIG. 6A. The first A signal may be power split 50%/50% into two signals. The second A signal may also be power split 50%/50% into two signals. One of the split signals of first signal A (1490 nm) is then combined with one of the split signals of second signal A (1550 nm) and output through port 3 of the module 36. The other of the split signals of first signal A is also combined with the other of the split signals of second signal A and output through port 4 of the module 36.

As shown in FIG. 6A, a similar circuitry can be implemented for two input B signals, one having a 1490 nm wavelength and the other one having a 1550 nm wavelength. The second splitter 300 can be used separately from the first splitter 300 in processing the B signals. As shown in FIG. 6A, as in the A signals, a first B signal having a first wavelength (1490 nm) and a second B signal having a second wavelength (1550 nm) may be input through ports 5 and 6. The first B signal may be power split 50%/50% into two signals. The second B signal may also be power split 50%/50% into two signals. One of the split signals of first signal B (1490 nm) is then combined with one of the split signals of second signal B (1550 nm) and output through port 7 of the module 36. The other of the split signals of first signal B is also combined with the other of the split signals of second signal B and output through port 8 of the module 36.

It should be noted that the fiber optic circuitry described above is simply one of many different embodiments that can be implemented using different fiber optic equipment within the module 36 and should not be used to limit the broad inventive concepts of the telecommunications module 36 and features thereof.

For example, in other embodiments, other types of fiber optic splitters (e.g., 1×6, 2×6, 1×4, 1×2, etc.) may be used, even though not all eight of the ports would be populated. Fiber optic equipment other than splitters (e.g., multiplexer/ demultiplexers, attenuators, equalizers, etc.) may also be used within the module 36.

Please note that in FIG. 6, for simplicity, all of the ports in the interior of the module 36 are shown as populated, illustrating the routing of the fiber optic cables therein, while only one of the connector ports is shown as being populated outside of the module 36.

As shown in FIG. 6, the same radius limiter 138 may be used for wrapping fiber optic cables of the A and B signal circuits. As discussed above, the fasteners mounts 142 of the main housing 52 may also be used for guiding cables within the interior of the main housing 52.

FIGS. 45-48 illustrate the slidable interaction of the telecommunications modules 36 with the walls 400 of the termination panel.

Figure 45:
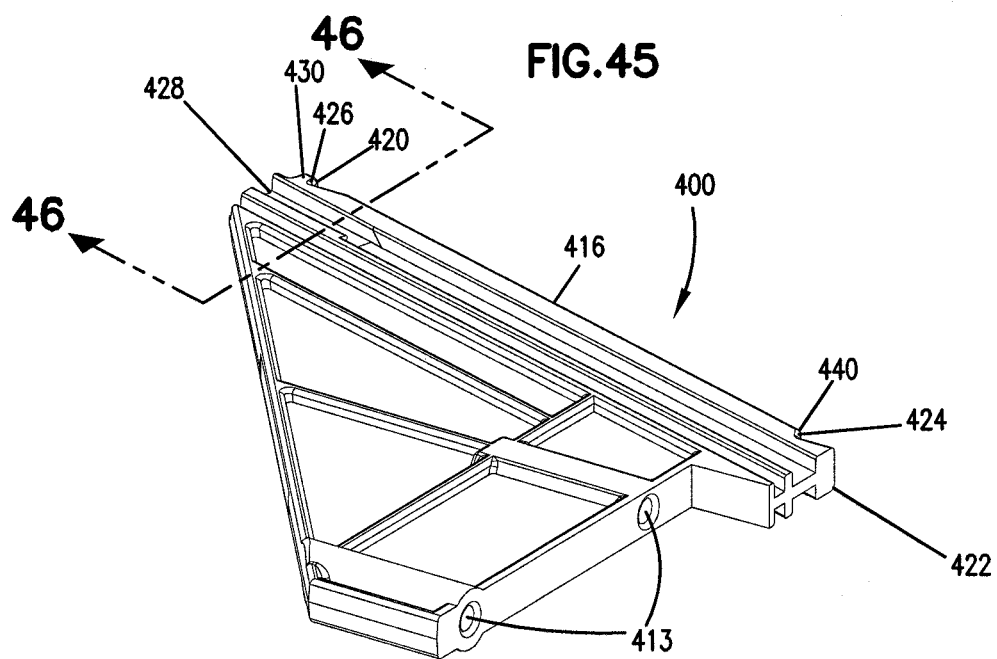
FIG. 45 is a perspective view of a wall constructed for mounting the telecommunications module of FIGS. 4-9 to a termination panel such as the panel shown in FIGS. 1-3.
Figure 46:
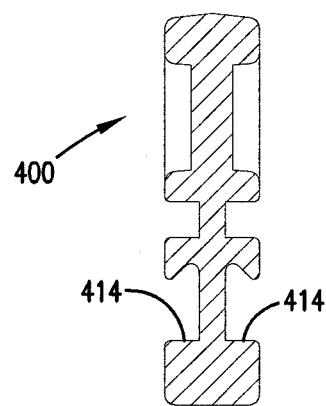
FIG. 46 is a cross-sectional view of the wall taken along line 46-46 of FIG. 45.

One of the walls 400 is illustrated in closer detail in FIGS. 45 and 46. Each wall 400 includes a guide edge 416 which defines a first notch 424 adjacent a first end 422 of the guide edge 416 and a second notch 426 adjacent a second end 428 of the guide edge. The second notch 426 is defined by a tab 430 that forms a shoulder 420 within the second notch 426. Referring to the cross-sectional view of the wall 400 in FIG. 46, the wall 400 also defines a pair of linear grooves 414 on opposite sides of the wall 400. A groove 414 from one wall is configured to cooperate with an opposing groove 414 from an adjacent wall to provide a track for the sliding telecommunications module 36, as will be described in further detail below. The walls 400 also include fastener openings 413 for mounting to a telecommunications device such as the termination panel 10 of FIGS. 1-3.

Figure 48:
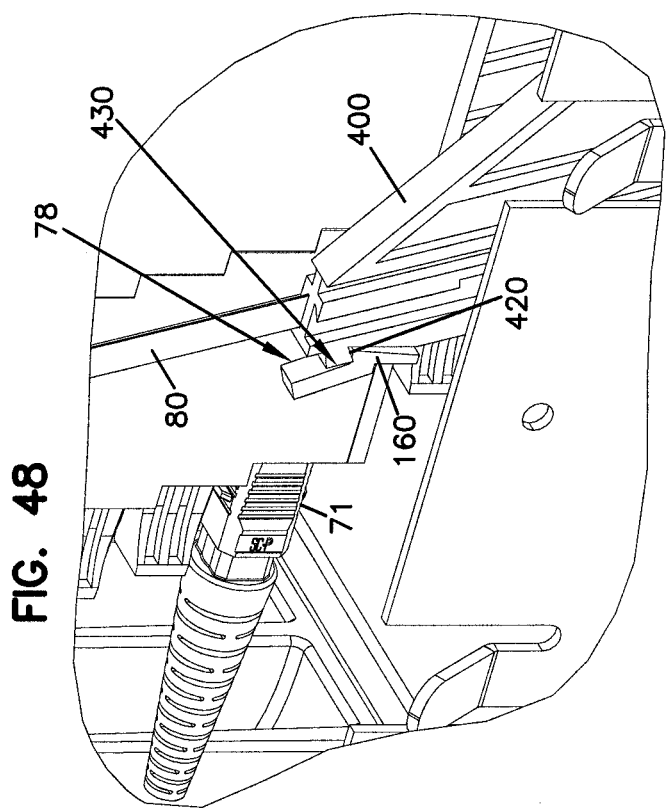
FIG. 48 is an enlarged portion of the perspective view of FIG. 3.

In FIG. 47, the sliding telecommunications module 36 is shown in a retracted position relative to the walls 400. In FIG. 48, the sliding telecommunications module 36 is shown in a fully extended position relative to the walls 400.

As discussed above, for slidability, the adapter block 56 of the telecommunications module 36 defines a pair of cooperating guide rails 80 for slidably mating with the grooves 414 formed on the wall 400. As shown in FIG. 47, a latching tab 150 of the integrally formed pivotal latching arm 76 (located on top) of the telecommunications module 36 abuts against the shoulder 420 to keep the module 36 in a retracted position. The latching arm 76 has to be pivoted away from the tab 430 of the wall 400 to free the module 36. Once the latching tab 150 clears the shoulder 420 and is out of the second notch 426, the module 36 can be pulled by the handle portion 66 of the adapter block 56 to pull the module 36 away from the floor of the termination panel 10.

The module 36 must be pulled with sufficient force to clear a locking tab 160 of the locking arm 78 (located at the bottom) of the telecommunications module 36 from the first notch 424 of the wall 400. As shown in FIG. 45, the first notch 424 defines a ramped face 440. In the retracted position, the locking tab 160 of the locking arm 78 of the module 36 sits within the first notch 424 against the ramped face 440 while the latching tab 150 of the latching arm 76 of the module 36 sits within the second notch 426. If the module 36 is pulled with enough force, the locking arm 78 pivots as the locking tab 160 rides along the ramped face 440 and clears the first notch 424.

After the module 36 is released, the module 36 can be manually pulled such that the guide rails 80 slide within the linear grooves 414 of the walls 400 until the locking tab 160 of the locking arm 78 makes contact with the shoulder 420 defined within the second notch 426 of the wall 400. As shown in FIG. 48, in the extended position, the locking tab 160 of the locking arm 78 abuts against the shoulder 420 to keep the module 36 coupled to the walls 400 and prevents the module 36 from sliding off the walls 400.

If desired, at the fully extended position, the locking tab 160 may be pivoted away from the walls 400 to move the locking tab 160 out of the second notch 426 to allow module 36 to be completely separated from the walls 400 and the rest of the fiber termination panel 10, such as for repair or replacement of the telecommunications module 36. The elastically pivotal configuration of the integral latching arm 76 and the integral locking arm 78 facilitates slidability and release of the module 36 from the walls 400.

It should be understood that the high-density termination panel 10 shown in FIGS. 1-3 is only one example of many different types of devices, equipment or fixtures where the sliding telecommunications modules 36 described herein can be utilized. For example, the telecommunications modules 36 can be slidably coupled to fixtures in the form of a chassis with a movable drawer as in U.S. Pat. No. 6,504,988 and U.S. Patent Application Publication No. 2003/0007767, the entire disclosures of which are incorporated by reference. The telecommunications modules 36 can also be used in telecommunications chassis, equipment, and fixtures similar to those shown in U.S. Pat. No. 6,591,051, the entire disclosure of which is incorporated herein by reference.

The above specification, examples and data provide a complete description of the manufacture and use of the inventive aspects of the disclosure. Since many embodiments of the disclosure can be made without departing from the spirit and scope of the inventive aspects of the disclosure, the inventive aspects resides in the claims hereinafter appended.

What is claimed is:

1. A fiber optic adapter block comprising:

a one-piece main body including a front end, a rear end, a top wall, a bottom wall, a closed first side, and an open second side, the main body defining a plurality of openings extending from the front end to the rear end, each opening defining a separate fiber optic adapter, each fiber optic adapter separated from an adjacent fiber optic adapter by a shared wall extending from the front end to the rear end, each opening defining a longitudinal axis, each fiber optic adapter being configured to interconnect two cables terminated with fiber optic connectors along the direction of the longitudinal axis;

a fiber optic connector ferrule alignment structure mounted within each of the openings of the main body, the fiber optic connector ferrule alignment structure including a sleeve for aligning ferrules and a sleeve mount for receiving the sleeve, the fiber optic connector ferrule alignment structure mounted within the opening in a direction extending from the open second side toward the closed first side of the main body;

a cover panel coupled to the main body to close the open second side of the main body to capture the fiber optic connector ferrule alignment structures within the main body;

a pair of parallel guide rails extending generally from the top wall to the bottom wall, one of the guide rails located on the first side of the main body, the other of the guide rails located on the cover panel, the pair of guide rails configured for slidably mounting the fiber optic adapter block to a first telecommunications device; and a top guide located on the top wall of the main body and a bottom guide located on the bottom wall of the main body, the top and bottom guides being parallel to each other and to the longitudinal axes of the openings, the top and bottom guides configured for slidably mounting the fiber optic adapter block to a second telecommunications device.

2. A fiber optic adapter block according to claim 1, wherein the fiber optic adapters are configured for interconnecting SC-type fiber optic connectors.

3. A fiber optic adapter block according to claim 1, wherein the guide rails extend in a non-perpendicular direction with respect to the longitudinal axes of the openings and the top and bottom guides.

4. A fiber optic adapter block according to claim 1, wherein the main body includes eight openings, each defining a separate fiber optic adapter.

5. A fiber optic adapter block according to claim 4, wherein a length of the main body extending from the top wall to the bottom wall is about 3 inches.

6. A fiber optic adapter block according to claim 1, wherein the main body defines a stepped configuration extending from the top wall toward the bottom wall, wherein each of the fiber optic adapters are offset to one another in a direction along the longitudinal axes.

7. A fiber optic adapter block according to claim 6, wherein the guide rails define a first slope extending between the top wall and the bottom wall, the first slope being generally equal to a second slope defined by the stepped configuration of the main body.

8. A fiber optic telecommunications module comprising:
a main housing portion including a top wall, a bottom wall, a first transverse sidewall, a rear wall, an open front end, and an open second side, the main housing portion including an optical component therewithin;
a cover portion coupled to the main housing portion to close up the open second side of the main housing portion and keep the optical component within the main housing portion;
a fiber optic adapter block coupled to the main housing portion to close the open front end of the main housing portion, the fiber optic adapter block including a one-piece main body, the main body including a top wall and a bottom wall, the fiber optic adapter block defining a plurality of openings extending from a front end to a rear end of the main body, each opening defining a separate fiber optic adapter, each opening defining a longitudinal axis, the fiber optic adapters being configured to receive connectorized cables extending from the optical component within the main housing portion, the fiber optic adapter block including at least one guide rail extending generally between the top wall and the bottom wall of the main body, the guide rail configured for slidably mounting the fiber optic telecommunications module to a first telecommunications device once the fiber optic adapter block has been coupled to the main housing portion;
wherein the fiber optic adapter block and the main housing portion include intermating keys for slidably coupling the fiber optic adapter block to the main housing portion in a direction extending along the longitudinal axes of the openings defining the adapters; and wherein the main housing portion includes an integrally formed pivotable latching arm, the latching arm configured to pivot for selectively latching and unlatching the telecommunications module for slidable movement with respect to the first telecommunications device.

9. A fiber optic telecommunications module according to claim 8, wherein the main body includes a closed first side and an open second side, wherein a fiber optic connector ferrule alignment structure is mounted within each of the openings of the main body, the fiber optic connector ferrule alignment structure including a sleeve for aligning ferrules and a sleeve mount for receiving the sleeve, the fiber optic connector ferrule alignment structure mounted within the opening in a direction extending from the open second side toward the closed first side of the main body and a cover panel is coupled to the main body to close the open second side of the main body to capture the fiber optic connector ferrule alignment structures within the main body.

10. A fiber optic telecommunications module according to claim 9, wherein the at least one guide rail of the fiber optic adapter block includes a pair of parallel guide rails, one of the guide rails located on the main body, the other of the guide rails located on the cover panel.

11. A fiber optic telecommunications module according to claim 8, wherein the at least one guide rail extends in a non-perpendicular direction with respect to the longitudinal axes of the openings of the main body.

12. A fiber optic telecommunication module according to claim 8, wherein the main body includes eight openings, each defining a separate fiber optic adapter.

13. A fiber optic telecommunications module according to claim 12, wherein a length of the main body extending from the top wall to the bottom wall is about 3 inches.

14. A fiber optic telecommunications module according to claim 8, wherein the fiber optic adapters are configured for interconnecting SC-type fiber optic connectors.

15. A fiber optic telecommunications module according to claim 8, wherein the main body defines a stepped configuration extending from the top wall toward the bottom wall, wherein each of the fiber optic adapters are offset to one another in a direction along the longitudinal axes.

16. A fiber optic telecommunications module according to claim 8, wherein the intermating keys include a slot on at least one of the top and bottom walls of the main housing and a longitudinal guide on at least one of the top and bottom walls of the main body of the adapter block.

17. A fiber optic telecommunications module according to claim 8, wherein the latching arm of the main housing portion is located adjacent the top wall of the main housing portion, wherein the main housing portion includes a second integrally formed pivotable locking arm located adjacent the bottom wall of the main housing portion, the locking arm configured to pivot for selectively locking and unlocking the telecommunications module for slidable movement with respect to the first telecommunications device, wherein the locking arm can be pivoted to completely separate the fiber optic telecommunications module from the first telecommunications device.

18. A fiber optic telecommunications module according to claim 8, wherein the optical component is a fiber optic splitter.

19. A fiber optic assembly comprising:
a fixture;
a fiber optic telecommunications module slidably coupled to the fixture; the fiber optic telecommunications module including a main housing portion including an optical component within an interior of the main housing portion and a fiber optic adapter block coupled to the main housing portion, the fiber optic adapter block including a one-piece main body, the main body including a top wall and a bottom wall, the fiber optic adapter block defining a plurality of openings extending from a front end to a rear end of the main body, each opening defining a separate fiber optic adapter, each opening defining a longitudinal axis, the fiber optic adapters being configured to receive connectorized cables extending from the optical component within the interior of the main housing portion, the fiber optic adapter block including at least one guide rail extending generally between the top wall and the bottom wall of the main body, the guide rail configured for slidably mounting the fiber optic telecommunications module to the fixture once the fiber optic adapter block has been coupled to the main housing portion;

wherein the main housing portion includes an integrally formed pivotable latching arm, the latching arm configured to pivot for selectively latching and unlatching the fiber optic telecommunications module for slidable movement with respect to the fixture.

20. A fiber optic assembly according to claim 19, wherein the optical component is a fiber optic splitter.

* * * * *